(12) United States Patent
Tokubo et al.

(10) Patent No.: US 10,585,472 B2
(45) Date of Patent: Mar. 10, 2020

(54) WIRELESS HEAD MOUNTED DISPLAY WITH DIFFERENTIAL RENDERING AND SOUND LOCALIZATION

(71) Applicant: Sony Interactive Entertainment Inc., Tokyo (JP)

(72) Inventors: Todd Tokubo, San Mateo, CA (US); Steven Osman, San Francisco, CA (US); Jeffrey Roger Stafford, Redwood City, CA (US); Crusoe Xiadong Mao, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/337,469

(22) Filed: Oct. 28, 2016

(65) Prior Publication Data

US 2017/0045941 A1 Feb. 16, 2017

Related U.S. Application Data

(63) Continuation-in-part of application No. 15/283,138, filed on Sep. 30, 2016, now Pat. No. 10,209,771, and
(Continued)

(51) Int. Cl.
*G02B 27/01* (2006.01)
*G06F 3/01* (2006.01)
(Continued)

(52) U.S. Cl.
CPC ............ *G06F 3/013* (2013.01); *A63F 13/211* (2014.09); *A63F 13/213* (2014.09); *A63F 13/25* (2014.09);
(Continued)

(58) Field of Classification Search
CPC ....................................................... G06F 3/013
See application file for complete search history.

(56) References Cited

U.S. PATENT DOCUMENTS 4,348,186 A * 9/1982 Harvey ................. G09B 9/307
434/44
6,377,401 B1 4/2002 Bartlett
(Continued)

FOREIGN PATENT DOCUMENTS

| CN | 101459797 | 6/2009 |
| CN | 101771814 | 7/2010 |

(Continued)

OTHER PUBLICATIONS

You, Suya et al., "Fusion of Vision and Gyro Tracking for Robust Augmented Reality Registration," Proceedings IEEE 2001 Virtual Reality (VR). Yokohama, Japan, Mar. 13-17, 2001; [Proceedings IEEE Virtual Reality (VR)], Los Alamitos, CA, IEEE Comp. Soc, US, Jan. 1, 2001 (Jan. 1, 2001), pp. 71-78, XP031172752, DOI: 10.1109/VR.2001.913772, ISBN: 978-0-7969-0948-8.
(Continued)

*Primary Examiner* — Hang Lin
(74) *Attorney, Agent, or Firm* — Penilla IP, APC

(57) ABSTRACT

A method is provided, including the following method operations: receiving captured images of an interactive environment in which a head-mounted display (HMD) is disposed; receiving inertial data processed from at least one inertial sensor of the HMD; analyzing the captured images and the inertial data to determine a current and predicted future location of the HMD; using the predicted future location of the HMD to adjust a beamforming direction of an RF transceiver towards the predicted future location of the HMD; tracking a gaze of a user of the HMD; generating image data depicting a view of a virtual environment for the HMD, wherein regions of the view are differentially ren-
(Continued)

dered; generating audio data depicting sounds from the virtual environment, the audio data being configured to enable localization of the sounds by the user; transmitting the image data and the audio data via the RF transceiver to the HMD.

18 Claims, 28 Drawing Sheets

Related U.S. Application Data a continuation-in-part of application No. 14/206,849, filed on Mar. 12, 2014, now Pat. No. 9,897,805, application No. 15/337,469, which is a continuation-in-part of application No. 14/706,575, filed on May 7, 2015, now Pat. No. 9,736,613, which is a continuation of application No. 13/478,582, filed on May 23, 2012, now Pat. No. 9,037,468.

(60) Provisional application No. 61/832,755, filed on Jun. 7, 2013, provisional application No. 61/523,100, filed on Aug. 12, 2011, provisional application No. 61/539,676, filed on Sep. 27, 2011.

(51) Int. Cl.
| | |
|---|---|
| *G09G 5/14* | (2006.01) |
| *H04S 7/00* | (2006.01) |
| *A63F 13/53* | (2014.01) |
| *A63F 13/213* | (2014.01) |
| *A63F 13/25* | (2014.01) |
| *A63F 13/211* | (2014.01) |
| *G09G 3/00* | (2006.01) |
| *G06F 3/147* | (2006.01) |
| *G06F 3/16* | (2006.01) |
| *A63F 13/32* | (2014.01) |
| *A63F 13/54* | (2014.01) |
| *A63F 13/30* | (2014.01) |

(52) U.S. Cl.
CPC .............. *A63F 13/32* (2014.09); *A63F 13/53* (2014.09); *A63F 13/54* (2014.09); *G06F 3/147* (2013.01); *G06F 3/167* (2013.01); *G09G 3/003* (2013.01); *G09G 5/14* (2013.01); *H04S 7/303* (2013.01); *H04S 7/304* (2013.01); *A63F 13/30* (2014.09); *A63F 2300/6081* (2013.01); *A63F 2300/6615* (2013.01); *G09G 2340/0407* (2013.01); *G09G 2354/00* (2013.01); *G09G 2370/16* (2013.01); *H04S 2400/11* (2013.01); *H04S 2420/01* (2013.01)

(56) References Cited

U.S. PATENT DOCUMENTS

| | | | |
|---|---|---|---|
| 7,720,229 B2 | 5/2010 | Duraiswami et al. | |
| 7,973,702 B2 | 7/2011 | Rofougaran et al. | |
| 9,277,365 B1* | 3/2016 | Wilden | H04W 4/028 |
| 2002/0101612 A1 | 8/2002 | Lauper et al. | |
| 2002/0181115 A1 | 12/2002 | Massof et al. | |
| 2004/0193413 A1 | 9/2004 | Wilson et al. | |
| 2005/0001981 A1 | 1/2005 | Anderson et al. | |
| 2005/0008256 A1 | 1/2005 | Uchiyama et al. | |
| 2005/0108646 A1* | 5/2005 | Willins | G01C 21/20 |
| | | | 715/723 |
| 2005/0273185 A1* | 12/2005 | Teiwes | A61B 3/113 |
| | | | 700/44 |
| 2006/0119572 A1 | 6/2006 | Lanier | |
| 2007/0024579 A1 | 2/2007 | Rosenberg | |
| 2007/0049374 A1 | 3/2007 | Ikeda et al. | |
| 2007/0189551 A1 | 8/2007 | Kimijima | |
| 2008/0159544 A1 | 7/2008 | Kim | |
| 2008/0215184 A1 | 9/2008 | Choi et al. | |
| 2008/0297437 A1 | 12/2008 | Takahashi | |
| 2009/0022368 A1 | 1/2009 | Matsuoka et al. | |
| 2009/0099836 A1 | 4/2009 | Jacobsen et al. | |
| 2009/0103593 A1 | 4/2009 | Bergamo | |
| 2009/0225001 A1 | 9/2009 | Biocca et al. | |
| 2010/0026714 A1 | 2/2010 | Utagawa | |
| 2010/0075683 A1 | 3/2010 | Johansson et al. | |
| 2011/0141011 A1 | 6/2011 | Lashina et al. | |
| 2012/0032874 A1 | 2/2012 | Mukawa | |
| 2012/0093320 A1 | 4/2012 | Flaks et al. | |
| 2012/0093338 A1 | 4/2012 | Levi et al. | |
| 2012/0097012 A1 | 4/2012 | Kurihara et al. | |
| 2012/0105473 A1 | 5/2012 | Bar-Zeev et al. | |
| 2012/0106632 A1 | 5/2012 | Zhang | |
| 2012/0154536 A1 | 6/2012 | Stoker et al. | |
| 2012/0262558 A1 | 10/2012 | Boger et al. | |
| 2012/0268563 A1 | 10/2012 | Chou et al. | |
| 2012/0306850 A1* | 12/2012 | Balan | G06T 19/006 |
| | | | 345/419 |
| 2012/0308057 A1 | 12/2012 | Edwards et al. | |
| 2013/0169626 A1 | 7/2013 | Balan et al. | |
| 2013/0304479 A1 | 11/2013 | Teller et al. | |
| 2013/0335405 A1* | 12/2013 | Scavezze | G06T 19/20 |
| | | | 345/419 |
| 2014/0006026 A1 | 1/2014 | Lamb et al. | |
| 2014/0023995 A1 | 1/2014 | Jones et al. | |
| 2014/0029775 A1 | 1/2014 | Anderson | |
| 2014/0361977 A1 | 12/2014 | Stafford et al. | |
| 2014/0364212 A1 | 12/2014 | Osman et al. | |
| 2015/0264583 A1* | 9/2015 | Sundstrom | H04W 16/28 |
| | | | 342/373 |
| 2015/0363976 A1 | 12/2015 | Henson | |
| 2016/0042221 A1 | 2/2016 | Mei et al. | |
| 2016/0378204 A1 | 12/2016 | Chen et al. | |
| 2017/0045941 A1 | 2/2017 | Tokubo et al. | |
| 2017/0084074 A1 | 3/2017 | Hwang et al. | |
| 2017/0206712 A1 | 7/2017 | Petrovskaya et al. | |
| 2017/0295446 A1 | 10/2017 | Thagadur Shivappa | |

FOREIGN PATENT DOCUMENTS

| | | |
|---|---|---|
| CN | 101835072 | 9/2010 |
| CN | 101960866 | 1/2011 |
| WO | 2015183621 A1 | 12/2015 |
| WO | 2016014878 A1 | 1/2016 |

OTHER PUBLICATIONS

Valenti, Roberto et al., "Combining Head Pose and Eye Location Information for Gaze Estimation," IEEE Transactions on Image Processing, IEEE Service Center, Piscataway, NJ, US, vol. 21, No. 2, Feb. 1, 2012 (Feb. 1, 2012), pp. 802-815, XP011411998, ISSN: 1057-7149, DOI: 10.1109/TIP.2011.2162740

Notification of Transmittal of the International Search Report and the Written Opinion issued in International Application No. PCT/US2017/054605 (From PCT/ISA/220), with International Search Report (From PCT/ISA/210) and Written Opinion (From PCT/ISA/237), dated Jan. 23, 2018 (Jan. 23, 2018) (17 total pages).

* cited by examiner

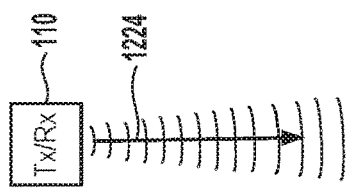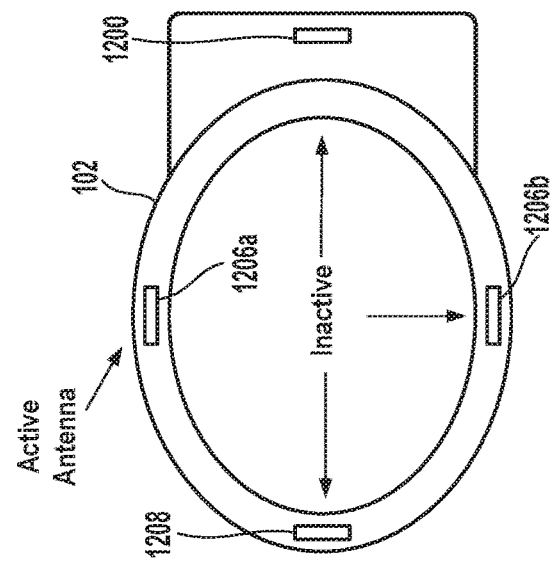
FIG. 12D
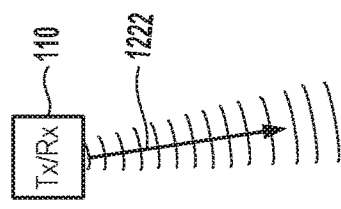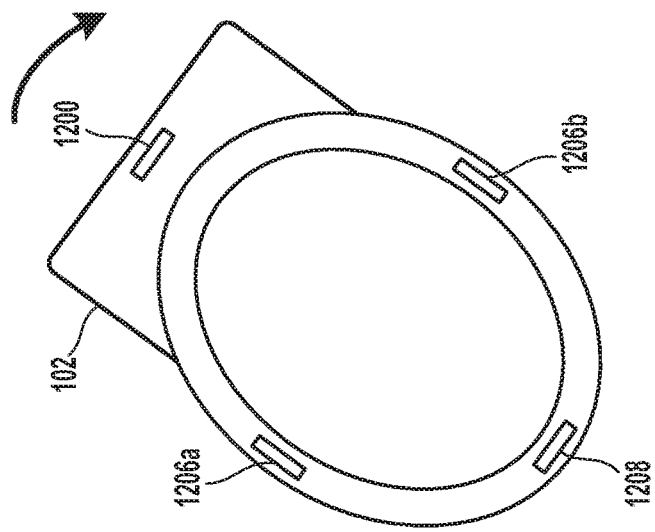
FIG. 12C
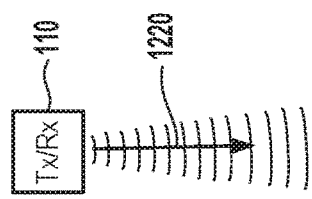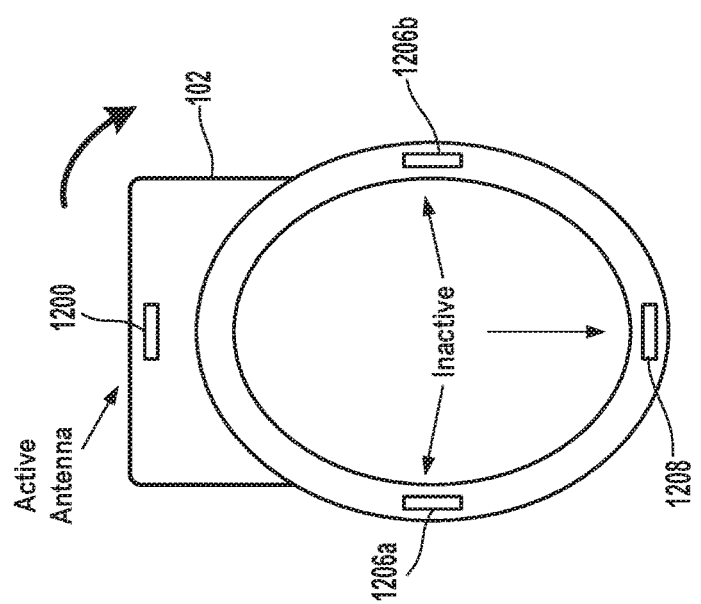
FIG. 12B

WIRELESS HEAD MOUNTED DISPLAY WITH DIFFERENTIAL RENDERING AND SOUND LOCALIZATION

CLAIM OF PRIORITY

This application claims priority as a continuation-in-part of U.S. application Ser. No. 15/283,138, filed Sep. 30, 2016, entitled "Predictive RF Beamforming for Head Mounted Display."

This application also claims priority as a continuation-in-part of U.S. application Ser. No. 14/206,849, filed Mar. 12, 2014, entitled Image Rendering Responsive to User Actions in Head Mounted Display," which claims priority to U.S. Provisional Application No. 61/832,755, filed Jun. 7, 2013.

This application also claims priority as a continuation-in-part of U.S. application Ser. No. 14/706,575, filed May 7, 2015, entitled "Sound Localization for User In Motion," which is a continuation of U.S. application Ser. No. 13/478,582 filed May 23, 2012, (now U.S. Pat. No. 9,037,468 issued May 19, 2015), which claims priority to U.S. Provisional Application No. 61/523,100, filed Aug. 12, 2011, and 61/539,676, filed Sep. 27, 2011.

The disclosures of these applications are incorporated by reference herein.

BACKGROUND

1. Field of the Disclosure

The present disclosure relates to predictive RF beamforming for transmission of data to head mounted displays (HMDs), and related methods, apparatus, and systems.

2. Description of the Related Art

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head-mounted display. A head-mounted display is worn by the user and can be configured to present various graphics, such as a view of a virtual space. The graphics presented on a head-mounted display can cover a large portion or even all of a user's field of view. Hence, a head-mounted display can provide a visually immersive experience to the user.

A head-mounted display (HMD) provides an immersive virtual reality experience, as the HMD renders a real-time view of the virtual environment in a manner that is responsive to the user's movements. The user wearing an HMD is afforded freedom of movement in all directions, and accordingly can be provided a view of the virtual environment in all directions via the HMD. However, the processing resources required to generate the video for rendering on the HMD are considerable and therefore handled by a separate computing device, such as a personal computer or a game console. The computing device generates the video for rendering to the HMD, and transmits the video to the HMD.

To provide a high fidelity experience, it is desirable to provide high quality video (e.g. at high resolution and frame rate). However, such video entails transmission of large amounts of data, requiring high bandwidth and a stable connection. Thus, current systems for HMD rendering use a wired connection to transfer data from the computing device to the HMD, as this affords the requisite bandwidth and connection stability. However, the presence of a wire that connects to the HMD can be bothersome to the user, as it may contact the user and detract from the immersive experience of using the HMD. Furthermore, the wired connection may inhibit the user's freedom of movement, as the user must be mindful of not over-extending the wire, and must avoid any movement which might cause disconnection or damage the wire. Furthermore, the presence of the wire presents a tripping hazard, which is amplified by the fact that the user cannot see the real environment while using the HMD.

It is in this context that implementations of the disclosure arise.

SUMMARY

Implementations of the present disclosure include devices, methods and systems relating to RF beamforming for a head mounted display.

In some implementations, a method is provided, including the following method operations: receiving captured images of an interactive environment in which a head-mounted display (HMD) is disposed; receiving inertial data processed from at least one inertial sensor of the HMD; analyzing the captured images and the inertial data to determine a current location of the HMD and a predicted future location of the HMD; using the predicted future location of the HMD to adjust a beamforming direction of an RF transceiver in a direction that is towards the predicted future location of the HMD; tracking a gaze of a user of the HMD; generating image data depicting a view of a virtual environment for the HMD, wherein regions of the view are differentially rendered based on the tracked gaze of the user; generating audio data depicting sounds from the virtual environment, the audio data being configured to enable localization of the sounds by the user when rendered to headphones that are connected to the HMD; transmitting the image data and the audio data via the RF transceiver to the HMD using the adjusted beamforming direction.

In some implementations, a region of the view towards which the gaze of the user is directed is rendered at a higher image quality setting than other regions of the view, the other regions of the view being rendered at a lower image quality setting to reduce a size of the image data.

In some implementations, the image quality setting includes one or more of an update frequency, resolution, complexity of imagery, or a rendering order value that determines an order for rendering the regions of the view.

In some implementations, the method further includes: tracking a trajectory of the gaze of the user; predicting a movement of the gaze of the user based on the trajectory of the gaze of the user; wherein the regions of the view are differentially rendered based on the predicted movement of the gaze of the user.

In some implementations, generating the audio data includes determining one or more emanating locations in the virtual environment for the sounds, wherein the audio data is configured to simulate the sounds as originating from the one or more emanating locations when rendered to the headphones.

In some implementations, generating the audio data uses an HRTF that is identified for the user.

In some implementations, generating the audio data is based on the current and/or predicted future location of the HMD.

In some implementations, analyzing the captured images and the inertial data includes identifying movement of the HMD, the predicted future location of the HMD being determined using the identified movement of the HMD.

In some implementations, identifying movement of the HMD includes determining a motion vector of the HMD, the predicted future location of the HMD being determined by applying the motion vector of the HMD to a current location of the HMD; wherein a magnitude of the motion vector identifies a speed of the movement of the HMD, and wherein a direction of the motion vector identifies a direction of the movement of the HMD.

In some implementations, the method further includes: adjusting an angular spread of the RF transceiver based on the speed of the movement of the HMD; wherein the angular spread increases with increasing speed of the movement of the HMD.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 2A-1 and 2A-2 illustrate a head-mounted display (HMD), in accordance with an implementation of the disclosure.

FIGS. 12B, 12C, and 12D illustrate overhead views of an HMD in an interactive real environment, illustrating switching of active antenna arrays on an HMD, in accordance with implementations of the disclosure.

DETAILED DESCRIPTION

The following implementations of the present disclosure provide devices, methods, and systems relating to predictive RF beamforming for a head mounted display (HMD).

In various implementations, the methods, systems, image capture objects, sensors and associated interface objects (e.g., gloves, controllers, peripheral devices, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

Figure 1:
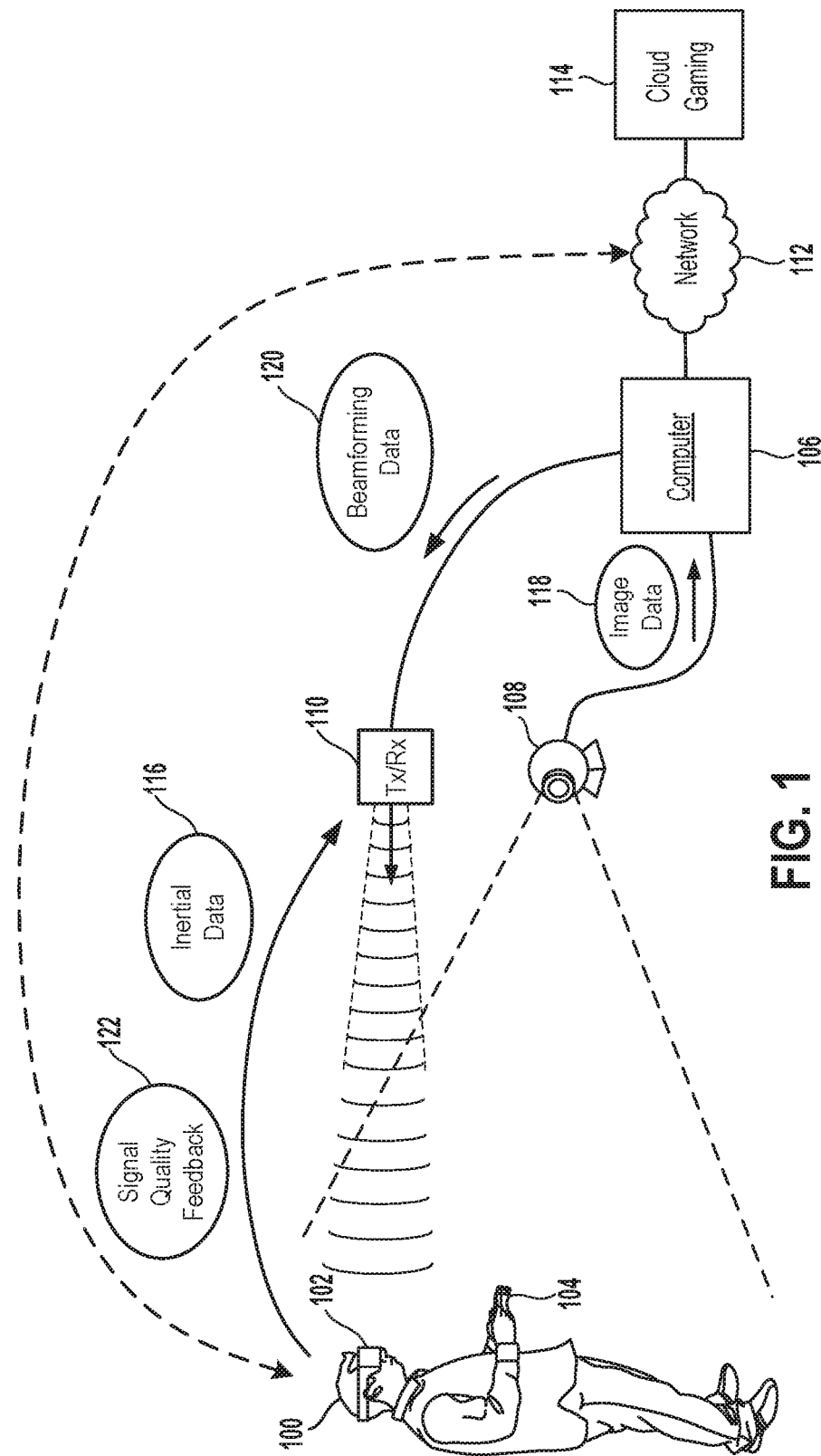
FIG. 1 illustrates a system for interaction with a virtual environment via a head-mounted display (HMD), in accordance with an implementation of the disclosure.

FIG. 1 illustrates a system for interaction with a virtual environment via a head-mounted display (HMD), in accordance with an implementation of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In the illustrated implementation, the HMD 102 is wirelessly connected to a computer 106. The computer 106 can be any general or special purpose computer known in the art, including but not limited to, a gaming console, personal computer, laptop, tablet computer, mobile device, cellular phone, tablet, thin client, set-top box, media streaming device, etc. In one implementation, the computer 106 can be configured to execute a video game, and output the video and audio from the video game for rendering by the HMD 102. A transceiver 110 is configured to wirelessly transmit the video and audio from the video game to the HMD 102 for rendering thereon. The transceiver 110 includes a transmitter for wireless transmission of data to the HMD 102, as well as a receiver for receiving data that is wirelessly transmitted by the HMD 102.

In some implementations, the HMD 102 may also communicate with the computer through alternative mechanisms or channels, such as via a network 112 to which both the HMD 102 and the computer 106 are connected.

The user 100 may operate an interface object 104 to provide input for the video game. Additionally, a camera 108 can be configured to capture images of the interactive environment in which the user 100 is located. These captured images can be analyzed to determine the location and movements of the user 100, the HMD 102, and the interface object 104. In various implementations, the interface object 104 includes a light which can be tracked, and/or inertial sensor(s), to enable determination of the interface object's location and orientation.

The way the user interfaces with the virtual reality scene displayed in the HMD 102 can vary, and other interface devices in addition to interface object 104, can be used. For instance, various kinds of single-handed, as well as two-handed controllers can be used. In some implementations, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another implementation, the computer 106 functions as a thin client in communication over a network 112 with a cloud gaming provider 114. In such an implementation, generally speaking, the cloud gaming provider 114 maintains and executes the video game being played by the user 102. The computer 106 transmits inputs from the HMD 102, the directional interface object 104 and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the interface object 104.

In some implementations, the HMD 102, interface object 104, and camera 108, may themselves be networked devices that connect to the network 112, for example to communicate with the cloud gaming provider 114. In some implementations, the computer 106 may be a local network device, such as a router, that does not otherwise perform video game processing, but which facilitates passage of network traffic. The connections to the network by the HMD 102, interface object 104, and camera 108 may be wired or wireless.

Additionally, though implementations in the present disclosure may be described with reference to a head-mounted display, it will be appreciated that in other implementations, non-head mounted displays may be substituted, including without limitation, portable device screens (e.g. tablet, smartphone, laptop, etc.) or any other type of display that can be configured to render video and/or provide for display of an interactive scene or virtual environment in accordance with the present implementations.

The amount of data, especially in the form of video data (e.g. including image data and audio data), that must be transmitted to the HMD to provide a high quality user experience when viewing a virtual environment is quite large. For this reason, current HMD technology requires a wired connection between the computer which generates the video data, and the HMD. However, as noted above, a wired connection to the HMD detracts from the user's freedom of movement, degrading the otherwise immersive experience that can be so effectively rendered through an HMD.

Providing a wireless connection that is capable of reliably transmitting the amount of data required for a high quality experience requires overcoming problems in terms of providing a high signal-to-noise ratio for high data bandwidth while also maintaining high connection stability to the HMD as it moves in accordance with movements of the user. To accomplish this, implementations of the present disclosure provide for wireless data transmission to the HMD using predictive beamforming. That is, in some implementations, tracked movement of the HMD is analyzed to predict future locations of the HMD, and beamforming is used to predictively steer an RF signal towards the predicted future locations of the HMD. RF signal strength is thereby maintained by steering the RF signal in an anticipatory manner so as to better track the HMD's location.

For purposes of ease of description in the present disclosure, reference is made to the actual or predicted location of the HMD as a location in the real-world space towards which an RF signal should be directed. However, it should be appreciated that the location of the HMD may more specifically refer to a particular location on, within, or relative to, the HMD, such as the location of a receiver antenna that is part of the HMD, a location of the display portion of the HMD, a center of the HMD, etc.

With continued reference to FIG. 1, an overview of a procedure for predictive beamforming for data transmission to an HMD is shown, in accordance with implementations of the disclosure. It should be appreciated that the location of the HMD 102 can be tracked using any variety of technologies. In the illustrated implementation, the HMD 102 transmits inertial data 116 generated from one or more inertial sensors of the HMD to the computer 106. Further, the computer 106 receives captured image data 118 from the camera 110, which is configured to capture images of the interactive environment in which the HMD 102 and the user 100 are disposed. The inertial data 116 and/or the image data 118 are analyzed by the computer 106 to identify and track the HMD 102 and its location, orientation, and movements.

A predicted future location of the HMD is determined using the tracked movements of the HMD 102. By way of example, a motion vector can be generated by the computer 106 based on the tracked movements of the HMD 102. This motion vector can be applied to the current location of the HMD 102 to predict the future location of the HMD. Using the predicted future location of the HMD, the computer 106 generates beamforming data 120 that is configured to direct the beamforming direction of the transceiver 110 towards the predicted future location of the HMD. By directing the beamforming direction of the transceiver in a predictive manner, a strong wireless signal can be maintained, as the movements of the HMD 102 will be anticipated and the beamforming direction of the signal will not lag such movements, but can move in a simultaneous and/or anticipatory manner with such movements of the HMD. In the present disclosure, reference is made to the beamforming parameters (e.g. direction and angular spread) of the transceiver 110. It will be appreciated that such beamforming parameters can be applied to either or both of the transmitter and the receiver which are parts of the transceiver. Broadly speaking, implementations focused on transmission of video data from the computer to the HMD may discuss beamforming in terms of transmission by the transceiver's transmitter. However, it should be appreciated that any such discussion of beamforming can also be applied to signal reception by the transceiver's receiver.

In some implementations, the camera 108 and the transceiver 110 are integrated in the same device, so that the camera and transceiver have a fixed spatial relationship to each other, and more specifically, the image capture by the camera and the RF beamforming by the transceiver are spatially known in relation to each other. In such implementations, the position of the HMD can be determined from captured images by the camera, and the beamforming by the transceiver can be appropriately directed towards the HMD without additional calibration being required.

In other implementations, the transceiver 110 and the camera 108 are separate devices which can be positioned in the local environment at different locations. In such implementations, a calibration may be performed to determine the spatial relationship of the image capture by the camera and the RF beamforming by the transceiver. In one implementation, this can be performed by analyzing captured images from the camera to determine the location of the HMD relative to the camera, and performing a test to determine the optimal beamforming direction for the determined location of the HMD, and correlating these pieces of information. Such a procedure may be performed for multiple locations of the HMD to achieve more accurate calibration results.

In some implementations, signal quality feedback 122 is provided from the HMD 102 to the computer 106, e.g. via the transceiver 110 or the network 112. The signal quality feedback 122 is indicative of the quality of the wireless transmission (e.g. signal strength, error rate, etc.), and provides information which can be used to evaluate whether the beamforming direction is being effectively steered towards the HMD 102 so as to provide sufficient data transmission rates.

Figures 1, 2A:
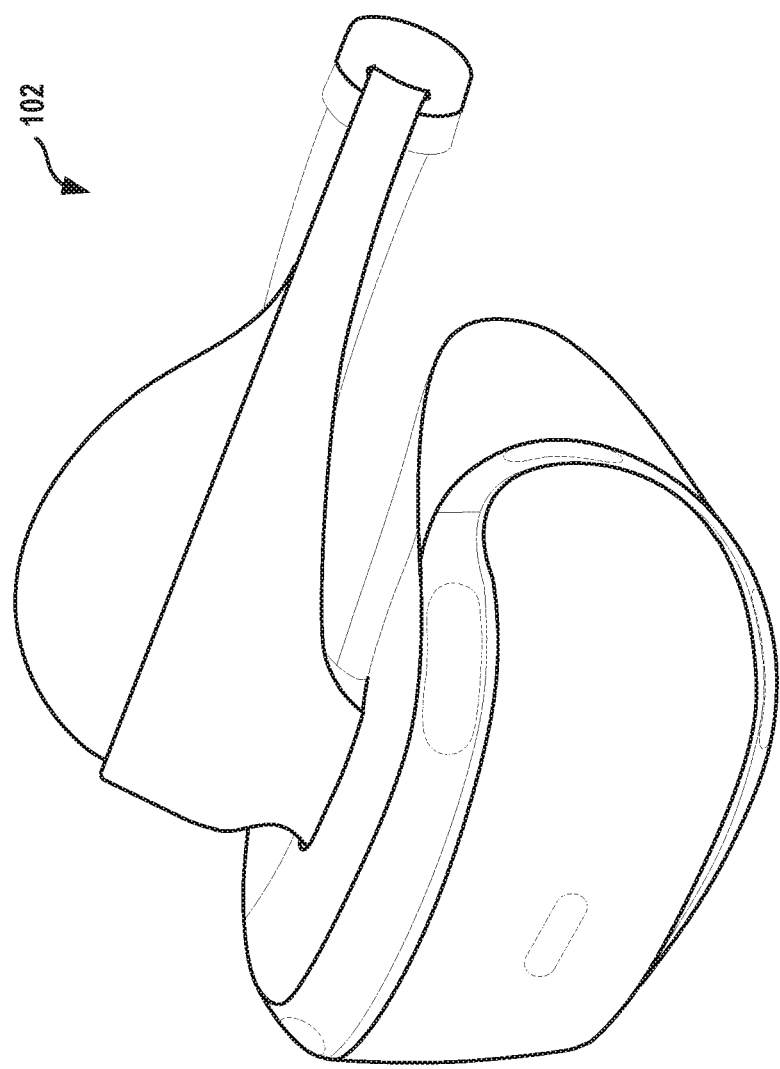
Figures 2, 2A:
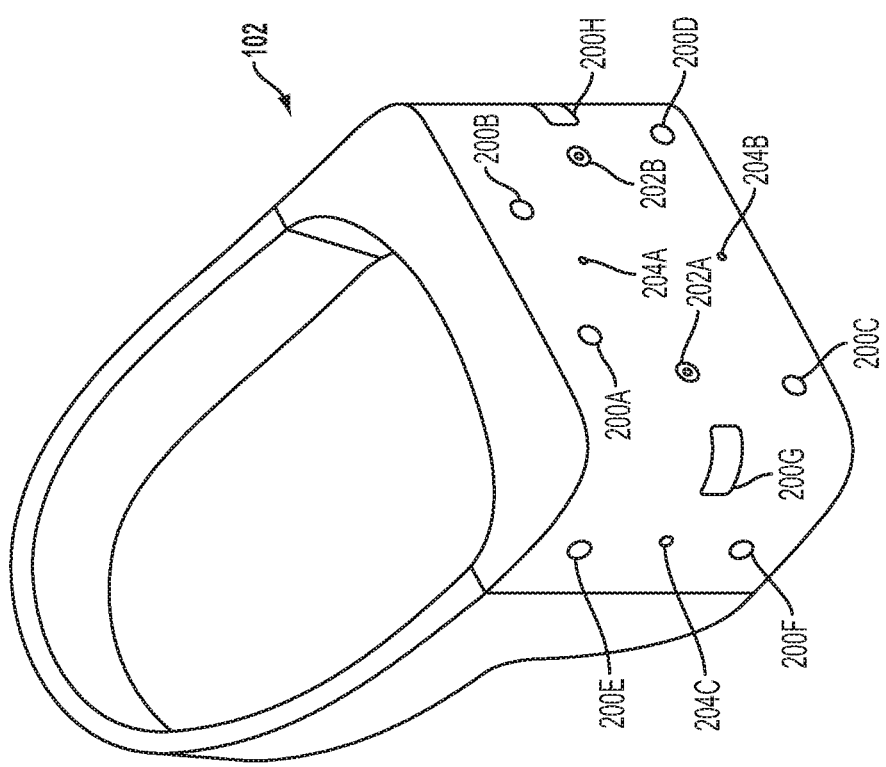

FIGS. 2A-1 and 2A-2 illustrate a head-mounted display (HMD), in accordance with an implementation of the disclosure. FIG. 2A-1 in particular illustrates the Playstation® VR headset, which is one example of a HMD in accordance with implementations of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one implementation, the lights can be configured to indicate a current status of the HMD to others in the vicinity. For example, some or all of the lights may be configured to have a certain color arrangement, intensity arrangement, be configured to blink, have a certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated implementation, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

Figure 3:
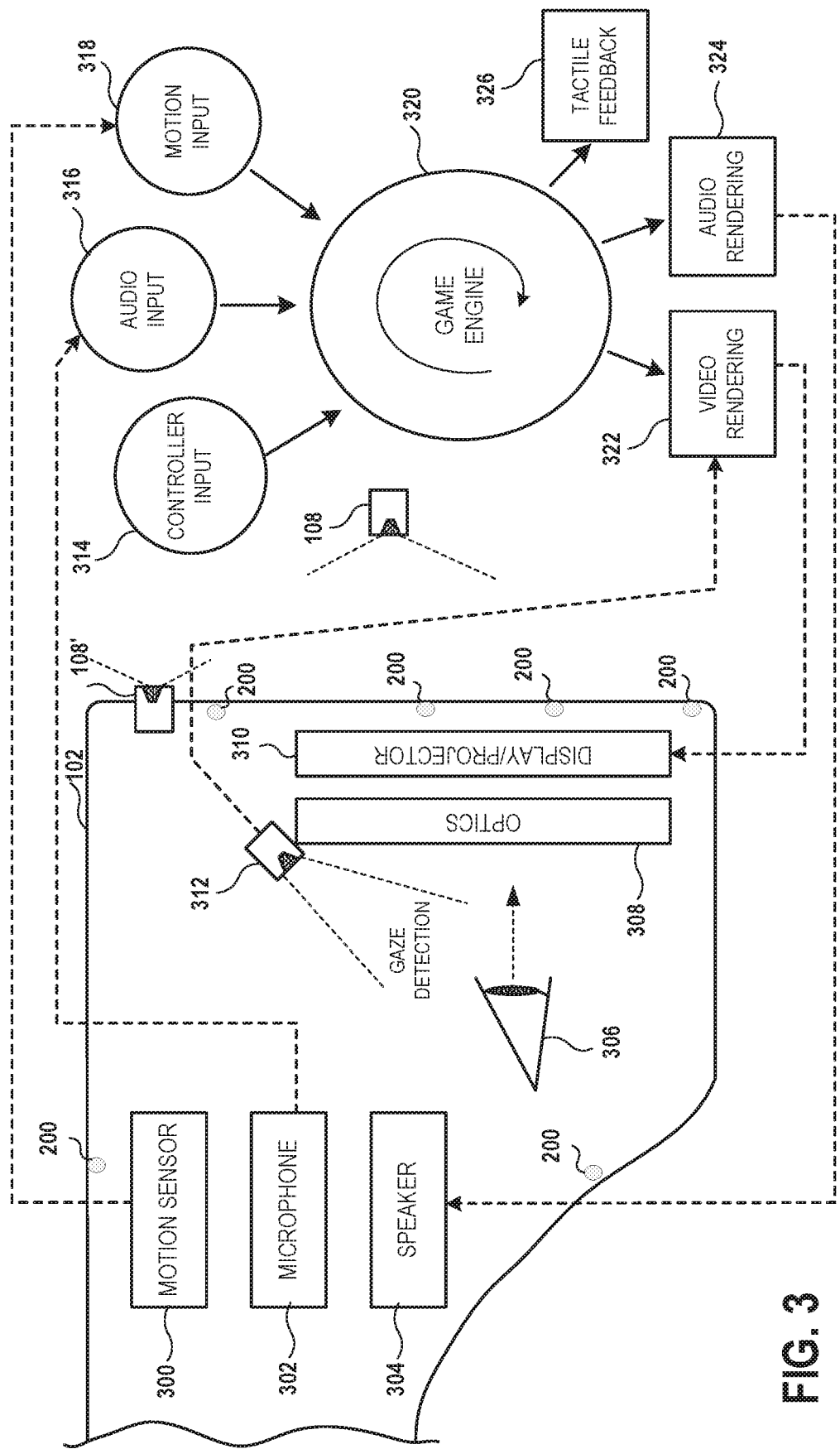
FIG. 3 conceptually illustrates the function of an HMD in conjunction with an executing video game, in accordance with an implementation of the disclosure.

The HMD 102 may also include one or more image capture devices. In the illustrated implementation, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated implementation, two cameras are shown on the front surface of the HMD 102, it will be appreciated that there may be any number of externally facing cameras installed on the HMD 102, oriented in any direction. For example, in another implementation, there may be cameras mounted on the sides of the HMD 102 to provide additional panoramic image capture of the environment.

Figure 2B:
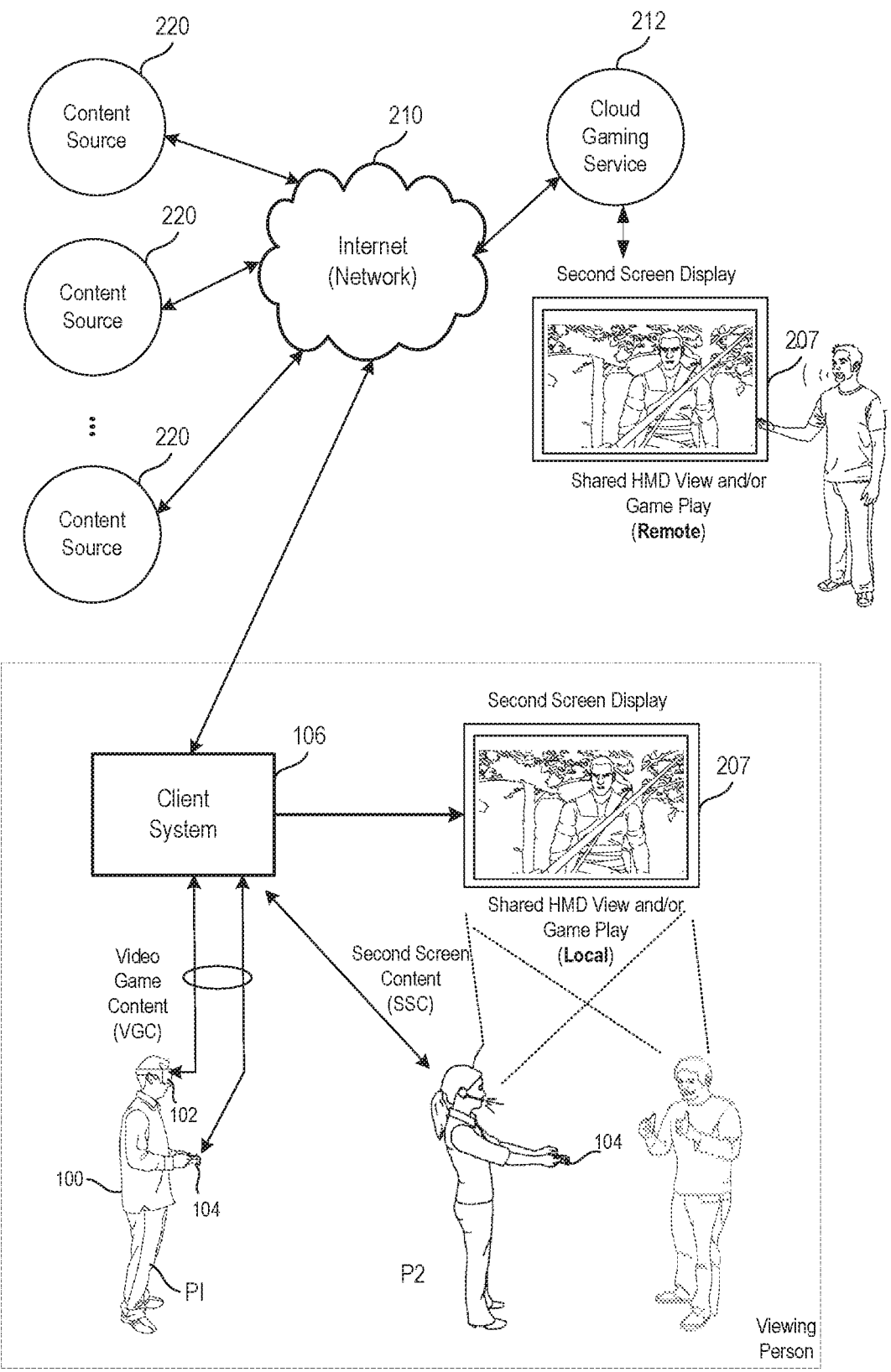
FIG. 2B illustrates one example of an HMD user interfacing with a client system, and the client system providing content to a second screen display, which is referred to as a second screen, in accordance with one implementation.

FIG. 2B illustrates one example of an HMD 102 user 100 interfacing with a client system 106, and the client system 106 providing content to a second screen display, which is referred to as a second screen 207. The client system 106 may include integrated electronics for processing the sharing of content from the HMD 102 to the second screen 207. Other implementations may include a separate device, module, connector, that will interface between the client system and each of the HMD 102 and the second screen 207. In this general example, user 100 is wearing HMD 102 and is playing a video game using a controller, which may also be directional interface object 104. The interactive play by user 100 will produce video game content (VGC), which is displayed interactively to the HMD 102.

In one implementation, the content being displayed in the HMD 102 is shared to the second screen 207. In one example, a person viewing the second screen 207 can view the content being played interactively in the HMD 102 by user 100. In another implementation, another user (e.g. player 2) can interact with the client system 106 to produce second screen content (SSC). The second screen content produced by a player also interacting with the controller 104 (or any type of user interface, gesture, voice, or input), may be produced as SSC to the client system 106, which can be displayed on second screen 207 along with the VGC received from the HMD 102.

Accordingly, the interactivity by other users who may be co-located or remote from an HMD user can be social, interactive, and more immersive to both the HMD user and users that may be viewing the content played by the HMD user on a second screen 207. As illustrated, the client system 106 can be connected to the Internet 210. The Internet can also provide access to the client system 106 to content from various content sources 220. The content sources 220 can include any type of content that is accessible over the Internet.

Such content, without limitation, can include video content, movie content, streaming content, social media content, news content, friend content, advertisement content, etc. In one implementation, the client system 106 can be used to simultaneously process content for an HMD user, such that the HMD is provided with multimedia content associated with the interactivity during gameplay. The client system 106 can then also provide other content, which may be unrelated to the video game content to the second screen. The client system 106 can, in one implementation receive the second screen content from one of the content sources 220, or from a local user, or a remote user.

FIG. 3 conceptually illustrates the function of the HMD 102 in conjunction with an executing video game, in accordance with an implementation of the disclosure. The executing video game is defined by a game engine 320 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated implementation, the game engine receives, by way of example, controller input 314, audio input 316 and motion input 318. The controller input 314 may be defined from the operation of a gaming controller separate from the HMD 102, such as a handheld gaming controller (e.g. Sony DUALSHOCK®4 wireless controller, Sony PlayStation® Move motion controller) or directional interface object 104. By way of example, controller input 314 may include directional inputs, button presses, trigger activation, movements, gestures, or other kinds of inputs processed from the operation of a gaming controller. The audio input 316 can be processed from a microphone 302 of the HMD 102, or from a microphone included in the image capture device 108 or elsewhere in the local environment. The motion input 318 can be processed from a motion sensor 300 included in the HMD 102, or from image capture device 108 as it captures images of the HMD 102. The game engine 320 receives inputs which are processed according to the configuration of the game engine to update the game state of the video game. The game engine 320 outputs game state data to various rendering modules which process the game state data to define content which will be presented to the user.

In the illustrated implementation, a video rendering module 322 is defined to render a video stream for presentation on the HMD 102. The video stream may be presented by a display/projector mechanism 310, and viewed through optics 308 by the eye 306 of the user. An audio rendering module 304 is configured to render an audio stream for listening by the user. In one implementation, the audio stream is output through a speaker 304 associated with the HMD 102. It should be appreciated that speaker 304 may take the form of an open air speaker, headphones, or any other kind of speaker capable of presenting audio.

In one implementation, a gaze tracking camera 312 is included in the HMD 102 to enable tracking of the gaze of the user. The gaze tracking camera captures images of the user's eyes, which are analyzed to determine the gaze direction of the user. In one implementation, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 312, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 326 is configured to provide signals to tactile feedback hardware included in either the HMD 102 or another device operated by the user, such as directional interface object 104. The tactile feedback may take the form of various kinds of tactile sensations, such as vibration feedback, temperature feedback, pressure feedback, etc. The directional interface object 104 can include corresponding hardware for rendering such forms of tactile feedback.

Figure 4:
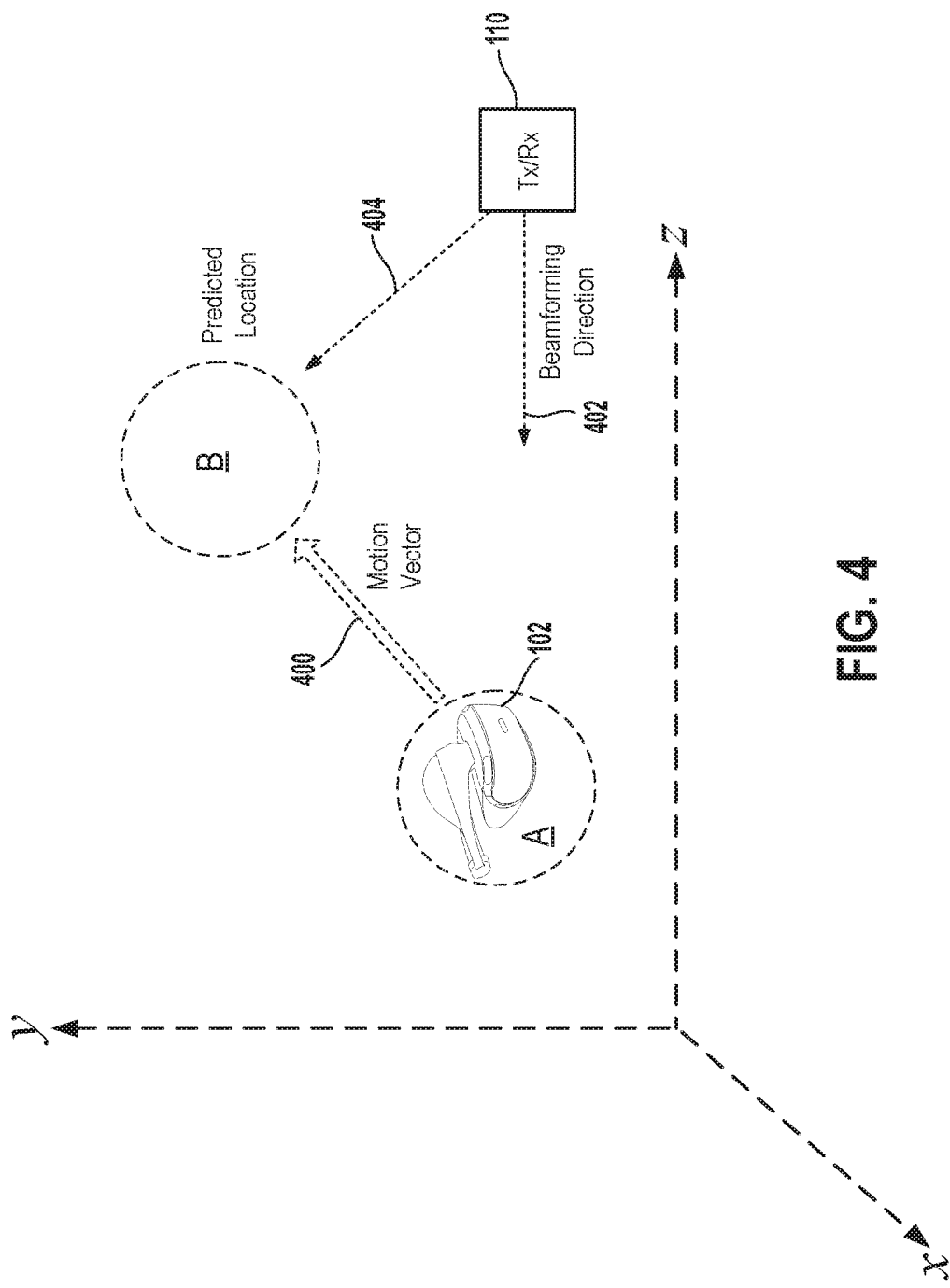
FIG. 4 illustrates adjustment of a beamforming direction of a transceiver based on prediction of a future location of an HMD, in accordance with implementations of the disclosure.

FIG. 4 illustrates adjustment of a beamforming direction of a transmitter based on prediction of a future location of an HMD, in accordance with implementations of the disclosure. In the illustrated implementation, the HMD 102 is shown in a three-dimensional space at an initial location A. The HMD 102 is capable of being moved in any direction under the control of a user, and as such it is desirable to steer the transmission beam towards the HMD 102.

In some implementations, a motion vector 400 is determined that is indicative of the current movement of the HMD 102. The current movement of the HMD can be determined from data generated by one or more inertial sensors of the HMD 102, as well as from analyzing captured images of the HMD (e.g. to track movement of lights or other recognizable portions of the HMD). In some implementations, the motion vector 400 is a velocity vector indicating both a spatial (three-dimensional (3D)) direction of the HMD's movement and a speed of the movement. The motion vector 400 can be applied to the current location A of the HMD to determine a predicted future location B of the HMD. That is, the future location B is predicted by extrapolating from the current location A using the direction and speed of movement of the HMD.

In some implementations, the motion vector 400 is itself predicted based on a determined acceleration of the HMD 102. That is the change in the velocity (including changes in the direction and speed) of the HMD can be determined from previously determined velocities of the HMD at earlier time points, and/or acceleration-sensing hardware (e.g. one or more accelerometers) defining the current acceleration of the HMD. This acceleration can be applied to the immediately preceding motion vector to determine the motion vector 400, which is applied to the current location to predict the future location as described above.

In the illustrated implementation, the initial beamforming direction 402 of the transceiver 110 is directed towards the initial location A of the HMD as shown. Based on the predicted future location B of the HMD, the beamforming direction is adjusted so as to be directed towards the future location B, as indicated by the updated beamforming direction 404. It will be appreciated that the adjustment of the beamforming direction is performed in a predictive manner that occurs before the actual future location of the HMD 102 is known. By anticipating the future location of the HMD, and predictively steering the beamforming direction accordingly, the wireless communication between the transceiver 110 and the HMD 102 can be improved, as the improved bandwidth that is provided via RF beamforming is maintained by continually steering its direction towards the HMD 102.

It will be appreciated that the beamforming direction is predictively adjusted, and therefore may or may not match the actual movement of the HMD to various extents. However, in accordance with implementations of the disclosure, a subsequent predicted location can be determined from a known current location that is determined based on the latest available information (e.g. via analysis of captured images from the camera). Thus, although a given adjusted beamforming direction may not specifically match the actual movement of the HMD, a subsequent adjustment of the beamforming direction will be based, at least in part, on the actual known location of the HMD, and therefore, the continual adjustment of the beamforming direction will not be susceptible to excessive deviation from the actual location of the HMD 102.

In some implementations, the beamforming update rate is on the order of about 10 to 100 milliseconds, and therefore the rate at which the future location of the HMD is predicted matches that of the beamforming update rate. In some implementations, the prediction rate is configured to match the frame rate of the camera, e.g. 60, 120, or 240 Hz in some implementations. Thus, the prediction will be to predict the location of the HMD at the next frame.

In some implementations, the inertial sensors of the HMD 102 may have better capabilities for detecting movement than the camera 108. For example, the inertial sensors may be sensitive to smaller movements than the camera 108, as the camera may be limited by its resolution (e.g. 720p or 1080p resolutions in some implementations). Furthermore, the sample rates of the inertial sensors may be significantly higher than the frame rate of the camera. For example, the camera may have a frame rate of about 60, 120 or 240 Hz, while the inertial sensors may have sample rates of over 1000 Hz. Further, the camera may require greater processing time (e.g. to analyze captured images) to determine location and/or movement. Thus, the inertial sensors can be more sensitive to movement with faster transient response that the camera 108.

However, the inertial sensors that detect relative movement can be prone to drift effects over time, and therefore are not exclusively relied upon to provide determinations of HMD location. Whereas, the camera 108 is better suited to provide accurate determinations of the location of the HMD, as fixed objects in the local environment can serve as anchors for purposes of determining the location of the HMD within the local environment.

Therefore, in various implementations, the use of inertial sensor data versus image capture data, either separately or in combination, can vary over time. For example, in some implementations, the sample rate of the inertial sensors may be N times faster than the frame rate of the camera. Thus, the predicted location of the HMD can be determined at a rate matching the sample rate of the inertial sensors, but with every Nth predicted location taking into account the image capture data from the camera (e.g. to verify the actual location of the HMD, on the basis of which the predicted location is determined). It will be appreciated that with each predicted location of the HMD, the beamforming direction of the transceiver 110 can be adjusted accordingly so as to be directed towards the predicted location of the HMD. Thus, the adjustments in beamforming direction may occur at a faster rate than the frame rate of the camera.

In related implementations, the rate at which the predicted locations of the HMD are determined does not necessarily match the sample rate of the inertial sensors, but is nonetheless faster than the frame rate of the camera, and/or faster than the rate at which predicted location determinations take into account captured image data. It will be appreciated that the sample rates of the inertial sensors and frame rates of the camera can be configurable within the operating ranges of these devices, and that such can be controlled as necessary to enable location prediction as discussed.

In some implementations, the faster sample rate of the inertial sensors is leveraged to improve determinations of the motion vector, for example by taking into account the acceleration of the HMD in real space based on the (additionally sampled, versus the captured images) inertial sensor data. The motion vector 400 may thus be better tailored to match the actual motion of the HMD, and thereby enable more accurate predicted locations of the HMD.

In some implementations, the time required to process and analyze captured image data from the camera is such that determinations of HMD location using the captured image data may lag the actual movements of the HMD to a noticeable extent. Thus, in some implementations, the captured image data is analyzed to determine the HMD's historical location, but not utilized as the current location for purposes of determining the predicted future location (based on inertial sensor data). Rather, the analysis of the captured image data is carried out and utilized to verify the historical location of the HMD, for example, against a previously predicted location of the HMD. The current prediction of HMD location may be adjusted based on such information if, for example, the previously predicted location of the HMD differs from the historical location by greater than a predefined amount.

Additionally, as discussed in further detail below, the prediction of HMD location may employ a prediction model. The accuracy of the prediction model may be evaluated based on comparing the historical location of the HMD, determined using the captured image data from the camera, against a previously predicted location for the same time. The prediction model may be adjusted based on such a comparison to provide improved results.

Figure 5B:
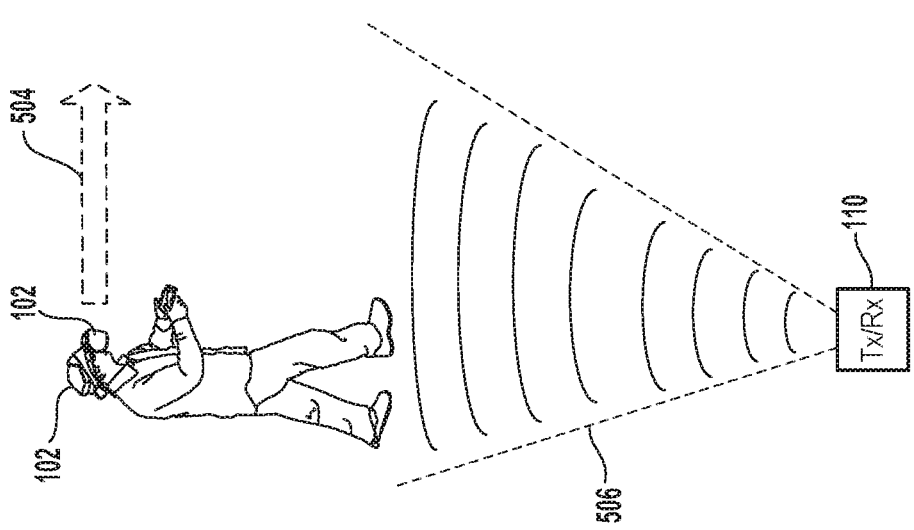
FIGS. 5A and 5B illustrate adjustment of the beamforming angular spread based on HMD movement, in accordance with implementations of the disclosure.
Figure 5A:
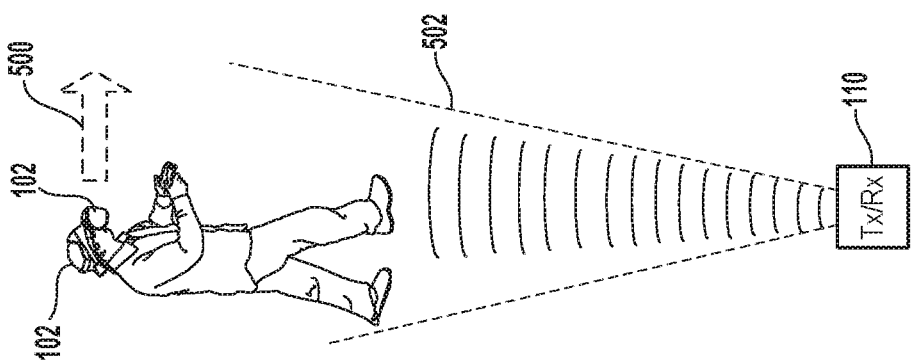

FIGS. 5A and 5B illustrate adjustment of the beamforming angular spread based on HMD movement, in accordance with implementations of the disclosure. It will be appreciated that in the present disclosure, the beamforming direction refers to the peak intensity direction of the main lobe of a beamforming transceiver 110. However, in addition to adjusting the beamforming direction, the beamforming angular spread, which is the angular width/spread of the main lobe, can also be adjusted. The angular spread of an electromagnetic beam can be defined using various definitions, such as the "full width at half maximum" (FWHM) (or "half power beam width" (HPBW) definition, which defines angular spread as the full width of the beam at half its maximum intensity.

In some implementations, the angular spread is adjusted based on the speed of the HMD 102. For example, at FIG. 5A, the HMD 102 operated by user 100 has a first speed indicated by the motion vector 500. Accordingly, the beamforming angular spread of the transceiver 110 is controlled to have an angular spread 502. At FIG. 5B, the HMD 102 operated by user 100 has a second speed indicated by the motion vector 504, which is faster than the first speed. Accordingly, the beamforming angular spread of the transceiver 110 is controlled to have an angular spread 506, which is wider/greater than the angular spread 502. The presently described implementation contemplates adjustment of the beamforming spread in manner that is positively correlated to the speed of the HMD, such that angular spread increases as HMD speed increases. This is useful for maintaining wireless connection stability, as the range of possible future locations of the HMD may tend to be greater when the HMD's speed is higher, and therefore a beamforming angular spread having greater angular width under such circumstances is more likely to maintain the HMD within the spread of the main lobe.

In a related implementation, the lateral speed of the HMD relative to the transceiver is prioritized versus the speed of the HMD in other directions, for purposes of determining the beamforming angular spread. It will be appreciated that when the HMD 102 is moving towards or away from the transceiver 110, the HMD may be less likely to move out of the main lobe of the transceiver, as opposed to when the HMD is moving in a lateral direction relative to the transceiver. Therefore, in some implementations, lateral movement of the HMD 102 relative to the transceiver 110 is considered, and the beamforming angular spread is adjusted in a positive correlation to the lateral speed.

In some implementations, the beamforming angular spread of the transceiver 110 is adjusted as a function of lateral speed of the HMD relative to the transceiver, to the exclusion of HMD speed in other non-lateral directions, such that the angular spread increases as lateral speed increases. In other implementations, the beamforming angular spread of the transceiver 110 is adjusted as a function of speed of the HMD, in a positive correlation such that angular spread increases as HMD speed increases, but with the lateral speed of the HMD being weighted more than HMD speed in other directions for purposes of determining the angular spread.

In some implementations, the distance of the HMD from the transceiver affects the beamforming angular spread. For example, when the HMD is closer to the transceiver, then movements of the HMD may be more likely to move the HMD out of the main lobe of the transceiver, versus when the HMD is further from the transceiver. Therefore, in some implementations, the beamforming angular spread is adjusted in inverse correlation to distance of the HMD from the transceiver, such that the angular spread increases as distance of the HMD from the transceiver decreases.

In related implementations, the concept can be applied based on detected movements of the HMD. For example, in some implementations, the beamforming angular spread is adjusted based on radial movement of the HMD towards/away from the transceiver, such that the angular spread is increased when radial movement of the HMD towards the transceiver is detected, and the angular spread is decreased when radial movement of the HMD away from the transceiver is detected. Furthermore, the amount of the increase or decrease in angular spread can be positively correlated to the speed of the HMD's radial movement towards or away from the transceiver, respectively.

Figure 5D:
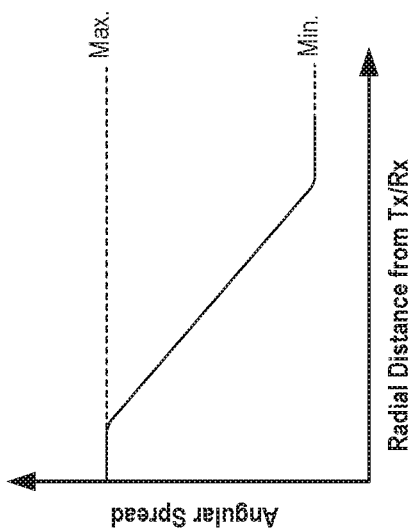
FIG. 5D is a graph illustrating beamforming angular spread of a transceiver versus radial distance of the HMD from the transceiver, in accordance with implementations of the disclosure.
Figure 5C:
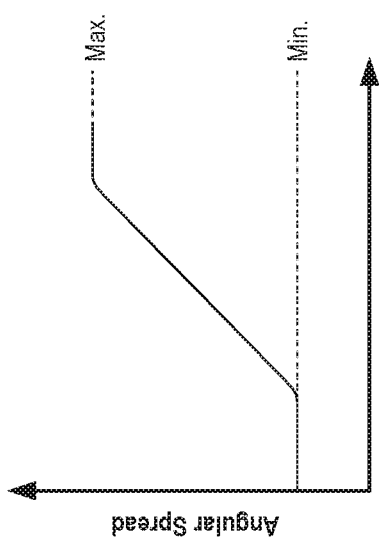
FIG. 5C is a graph illustrating beamforming angular spread of a transceiver versus speed of an HMD, in accordance with implementations of the disclosure.

FIG. 5C is a graph illustrating beamforming angular spread of a transceiver versus speed of an HMD, in accordance with implementations of the disclosure. Broadly speaking, the angular spread is positively correlated to the speed of the HMD, such that as HMD speed increases, so does the angular spread of the transceiver. However, below a certain minimum speed, the angular spread is maintained at a minimum value. And above a certain maximum speed, the angular spread is maintained at a maximum value. In some implementations, the speed of the HMD is specifically the lateral speed of the HMD relative to the transceiver. It will be appreciated that in accordance with the principles of the present disclosure, the speed of the HMD may be a predicted speed, e.g. based on factors such as a current speed and/or acceleration, and that the adjustment of the angular spread based on speed can thus be performed in a predictive manner.

FIG. 5D is a graph illustrating beamforming angular spread of a transceiver versus radial distance of the HMD from the transceiver. As shown, the angular spread generally inversely correlated to the radial distance of the HMD from the transceiver, with angular spread generally decreasing as the radial distance increases. However, below a certain minimum radial distance, the angular spread is maintained at a maximum value. And above a certain maximum radial distance the angular spread is maintained at a minimum value. It will be appreciated that in accordance with the principles of the present disclosure, the radial distance of the HMD from the transceiver may be a predicted radial distance, e.g. based on various factors such as current movement and acceleration, and that the adjustment of the angular spread based on radial distance can thus be performed in a predictive manner.

Figure 5E:
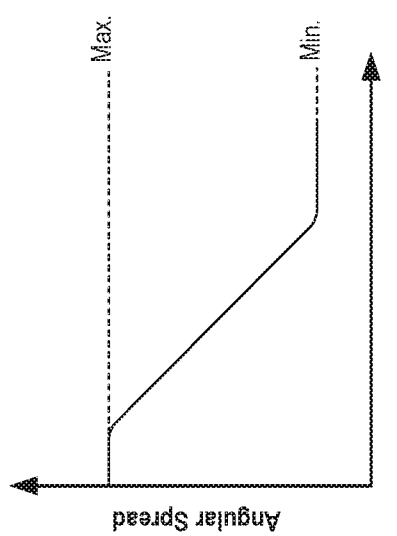
FIG. 5E is a graph illustrating beamforming angular spread of a transceiver versus transmission data rate, in accordance with implementations of the disclosure.

In some implementations, the angular spread can be determined based on other factors, such as data rate. FIG. 5E is a graph illustrating beamforming angular spread of a transceiver versus transmission data rate, in accordance with implementations of the disclosure. Broadly speaking, the angular spread is inversely correlated to the transmission data rate, so that angular spread decreases as the data rate increases. A narrower angular spread can provide higher bandwidth, albeit over a narrower width. Thus, by changing the angular spread as a function of data rate in this manner, there is a tradeoff between the available bandwidth when the signal is properly directed towards the HMD, and the wireless connection's tolerance to movement of the HMD. In some implementations, below a certain minimum data rate, the angular spread is maintained at a maximum value. And above a certain maximum data rate, the angular spread is maintained at a minimum value.

The above-described implementations which relate to adjustment of the beamforming angular spread are provided by way of example, without limitation. Further implementations falling within the scope of the present disclosure are encompassed by the combination of any of the foregoing implementations which are not exclusive of each other.

Figure 6C:
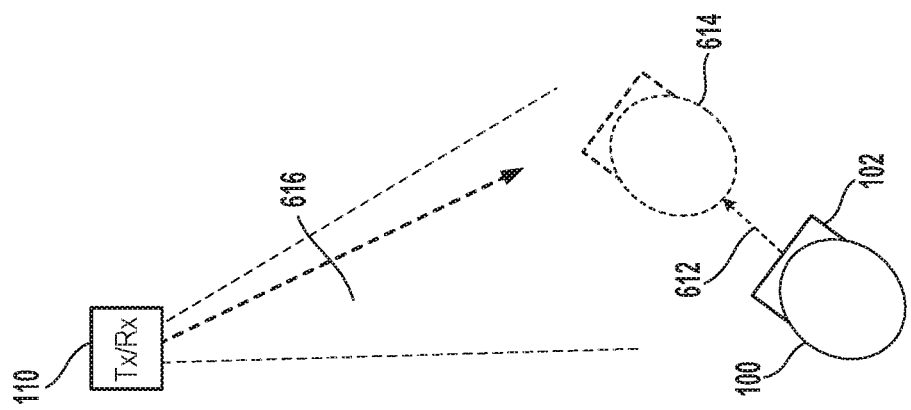
FIGS. 6A, 6B, and 6C illustrate a scenario wherein the beamforming direction is adjusted based on the gaze direction of the user 100, in accordance with implementations of the disclosure.
Figure 6B:
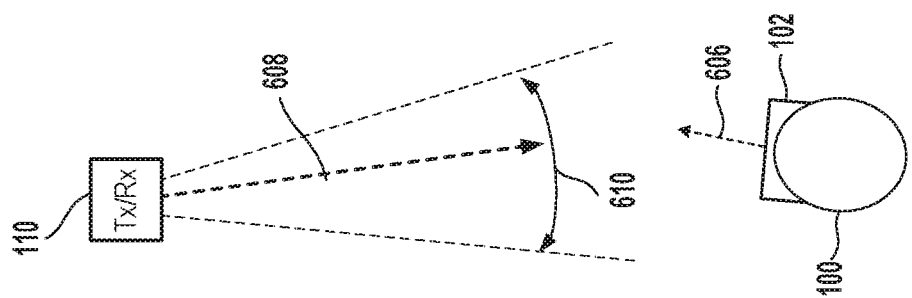
Figure 6A:
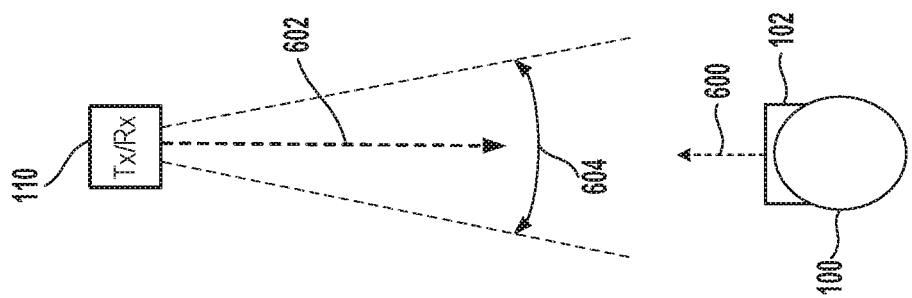

In some implementations, the beamforming direction and/or angular spread can be adjusted based on the gaze direction of the user. FIGS. 6A, 6B, and 6C illustrate a scenario wherein the beamforming direction is adjusted based on the gaze direction of the user 100, in accordance with implementations of the disclosure. FIG. 6A shows an overhead view of the user 100 wearing the HMD 102. The user 100 is shown having a gaze direction 600. The transceiver 110 is configured to have a beamforming direction 602 that is directed towards the HMD 102. It will be appreciated that the angular spread of the transceiver is approximately centered about the HMD 102.

At FIG. 6B, the user 100 has moved his gaze direction to the right to a gaze direction 606. A change in the gaze direction of the user 100 may be indicative that the user is about to move, for example, approximately in the direction of the new gaze direction. Therefore, in accordance with some implementations, the beamforming direction of the transceiver 110 is adjusted in response to changes in the user's gaze direction. With continued reference to FIG. 6B, as the gaze direction 606 has moved to the right of the user 100, so the beamforming direction 608 is moved in a similar direction, being responsively changed to an updated beamforming direction 608. Though the beamforming direction 608 is changed, its angular spread 610 is such that the HMD 102 is still located within the main lobe, so as to maintain the wireless connection with the HMD, as the HMD has not actually moved to a new location yet. It will be appreciated that the beamforming direction has been predictively moved based on changes in the user's gaze direction. While the HMD's location has not changed, the beamforming direction may be predictively adjusted, but within a range that maintains the HMD 102 within the angular spread of the transceiver 110.

At FIG. 6C, the user 100 has further moved his gaze direction to a gaze direction 612, by for example, additionally rotating his head. The user then moves to a new location indicated by ref. 614. As the user 100 moves, the beamforming direction of the transceiver is predictively moved to the direction 616, so as to maintain a strong wireless connection.

In some implementations, the gaze direction of the user (and/or changes thereof) is another factor that can be considered for purposes of predicting a future location of the HMD. The gaze direction can be weighted in combination with the additionally described factors for determining a predicted future location, and the beamforming direction can be adjusted accordingly. Furthermore, in additional implementations, the gaze direction of the user can be applied to affect the beamforming angular spread.

In some implementations, the location of the HMD can be tracked over time, and a distribution of the locations of the HMD within an interactive environment can be determined. Future locations of the HMD can be determined, at least in part, based on the historical location distribution of the HMD.

Figure 7:
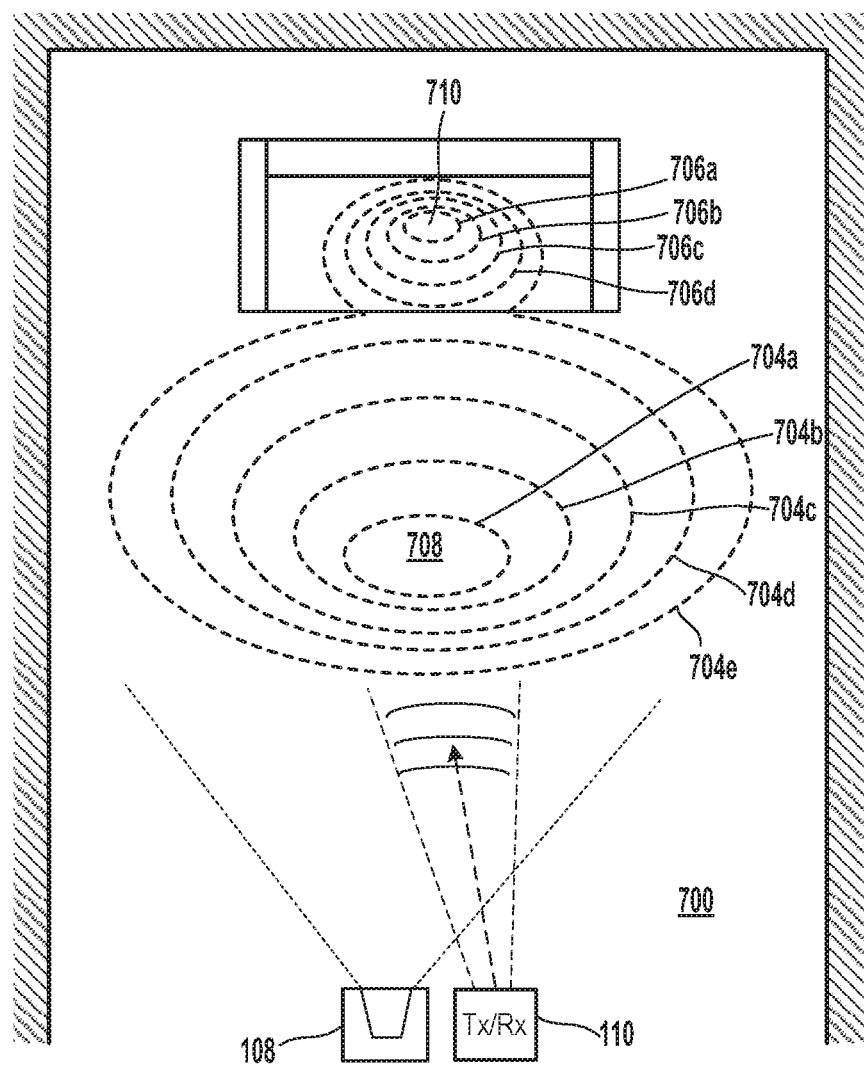
FIG. 7 illustrates an overhead view of a room 700 showing location distribution of an HMD, in accordance with implementations of the disclosure.

FIG. 7 illustrates an overhead view of a room 700 showing location distribution of an HMD, in accordance with implementations of the disclosure. The room 700 defines an interactive real environment in which the HMD is operated by the user, and in which the camera 108 and the transceiver 110 are disposed. The lines 704*a-e* and 706*a-d* are isometric location distribution lines based on historical locations of the HMD in the room 700. That is, the locations of the HMD during interactivity have been tracked over time, e.g. by recording the location of the HMD at periodic intervals, and the distribution of the locations in the room 700 are such that the density (number of occurrences per unit area) or frequency or probability of occurrence is the same or approximately the same along a given one of the lines 704*a-e* or 706*a-d*. In the illustrated implementation, the highest isometric value illustrated is that of the lines 704*a* and 706*a*, with diminishing values for the lines 704*b, c*, and *d*, as well as for lines 706*b, c*, and *d*. In the illustrated implementation, the line 704*e* represents the lowest isometric value that is illustrated.

It will be appreciated that the regions 708 and 710 exhibit the highest distribution density of locations for the HMD. In other words, the HMD has a statistically higher probability of being located in a unit area of the regions 708 and 710 versus other being located in a unit area of other regions of the room 700. In the illustrated implementation, a couch/chair 702 is shown in the room 700. The region 710 and surrounding regions correspond to a centrally seated location on the couch 702, as the user may spend significant amounts of time using the HMD while seated on the couch 702. The region 708 and surrounding regions are front of the couch, and thus may indicate regions where the user is standing in front of the couch while using the HMD.

In some implementations, the location distribution is utilized as a factor for determining the predicted future location of the HMD. For example, a probability or weight can be determined as a function of location that is indicative of the likelihood of the HMD being located at that location, and this can be used as a factor for determining the predicted future location of the HMD.

In a related implementation, for a given interactive application, HMD location/movement patterns across a plurality of users can be determined, for example by recording location/movement information for a plurality of HMD's and uploading such information to a server for processing and analysis. The location/movement information is correlated to the state of the interactive application, and thus HMD location/movement patterns for a given state of the interactive application (e.g. at a particular temporal or geographical location within a virtual environment defined by the interactive application) can be determined. This can provide crowd-sourced data regarding HMD location and movement for specific application states, which can be utilized to predict future locations and movements of a particular user's HMD during interaction with the interactive application.

Figure 8:
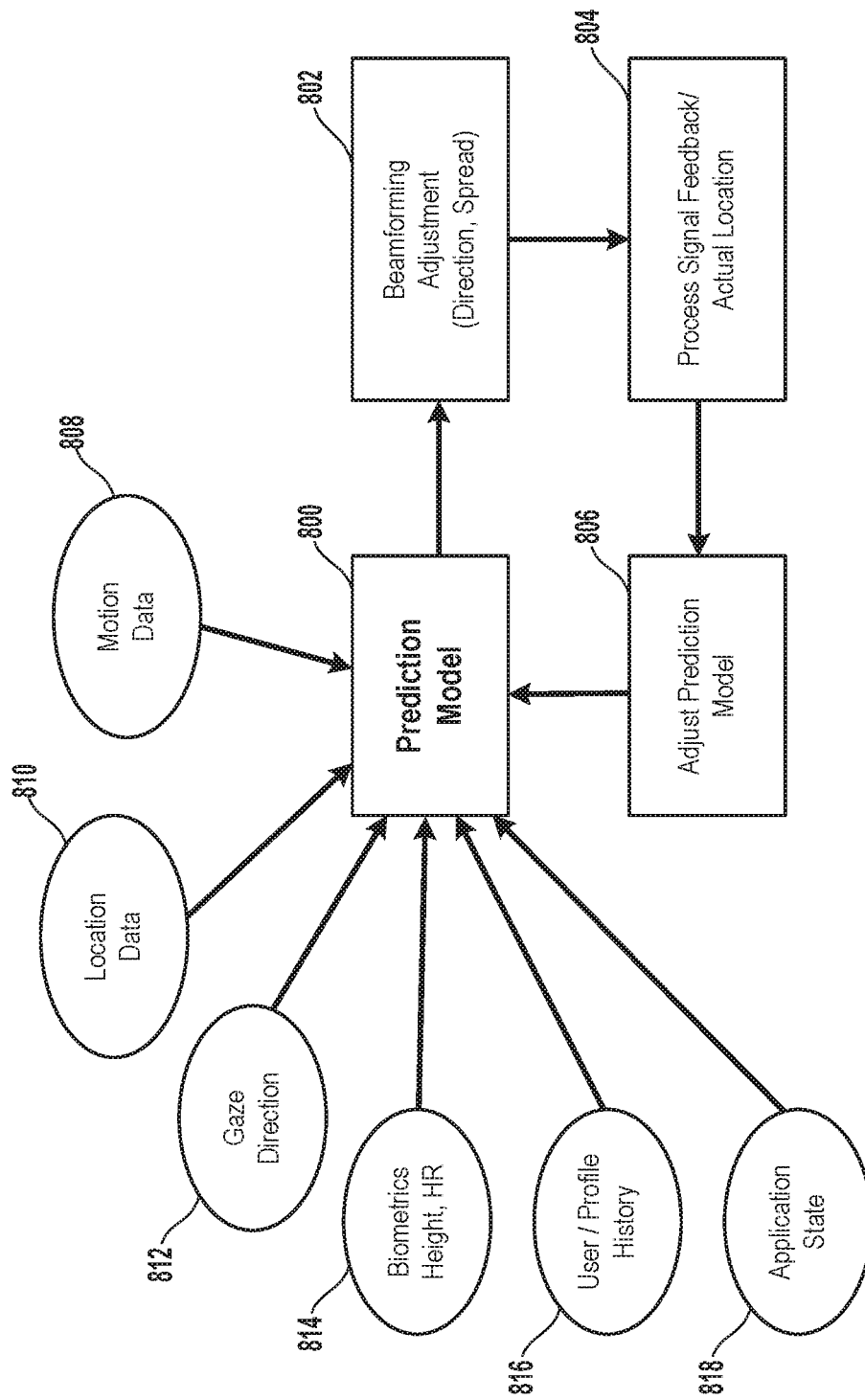
FIG. 8 conceptually illustrates the use of a prediction model to determine beamforming parameters, in accordance with implementations of the disclosure.

FIG. 8 conceptually illustrates the use of a prediction model to determine beamforming parameters, in accordance with implementations of the disclosure. The prediction model 800 is configured to predict a future location and/or movement (e.g. velocity, acceleration) of the HMD using one or more inputs.

By way of example, such inputs can include any of the following: motion data 808 (e.g. velocity (direction and speed), acceleration, rotation, etc.), location data 810 (e.g. 3D coordinates, relative location information, historical location information, etc.), gaze direction 812, user biometrics 814 (e.g. height, weight, heart rate, respiration, pupil dilation, etc.), user profile/history (e.g. user preferences, user movement/gesture patterns, etc.), and application state 818 (e.g. application variable states, virtual object states, etc.).

Based on the output of the prediction model, beamforming parameters of the transceiver are adjusted (ref. 802), which can include adjustment of the direction and/or angular spread of the main lobe. It will be appreciated that the beamforming of the transceiver is predictively adjusted so that the beamforming adjustments can occur simultaneous with or even prior to the actual movements of the HMD, so as to ensure that the HMD remains within the beamforming main lobe and is provided with a consistently strong wireless connection.

At operation 804, feedback data can be processed to evaluate the effectiveness of the beamforming adjustments and/or the prediction model's accuracy. In some implementations, the feedback data includes signal quality measurements taken by the HMD indicating the quality of the wireless signal received by the HMD from the transceiver. By way of example, such signal quality measurements can include signal strength, signal-to-noise ratio, bandwidth, errors, or other measures of the quality of the wireless signal transmitted by the transceiver and received by the HMD. By evaluating the signal quality of the transceiver, the effectiveness of the beamforming adjustments and/or the accuracy of the prediction model can be evaluated.

In some implementations, the feedback data includes location and/or movement data indicating the actual locations and/or movements of the HMD, which can be compared to predicted locations/movements generated by the prediction model, to evaluate the accuracy of the prediction model.

Based on the above, then at operation 806, the prediction model 800 can be adjusted to improve its accuracy. In some implementations, machine learning techniques can be applied to improve the prediction model.

Figure 9:
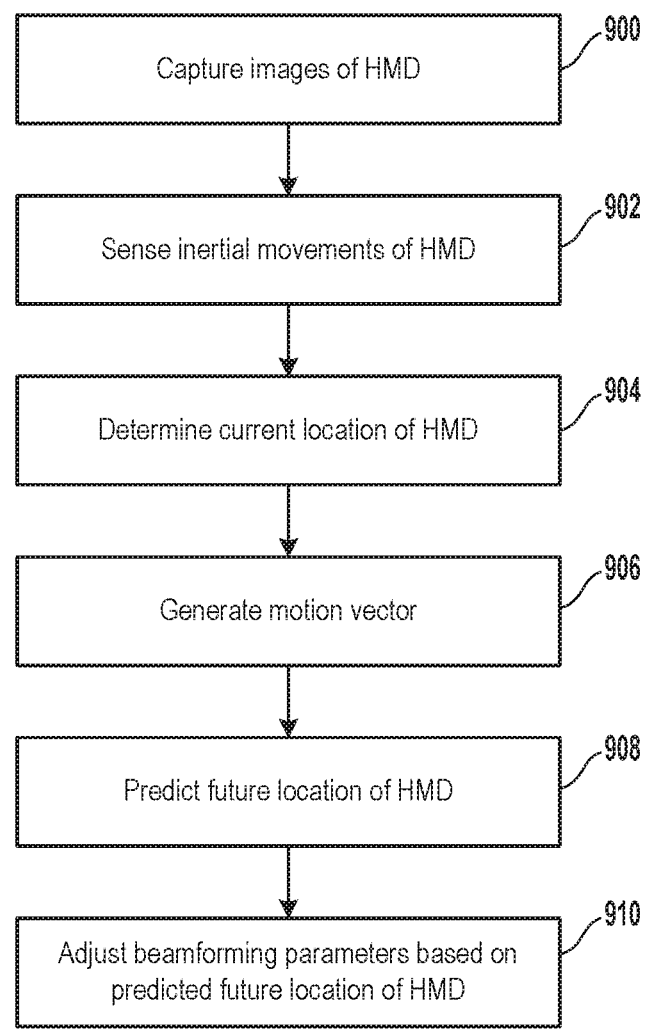
FIG. 9 illustrates a method for adjusting beamforming parameters using a predicted future location, in accordance with implementations of the disclosure.

FIG. 9 illustrates a method for adjusting beamforming parameters using a predicted future location, in accordance with implementations of the disclosure. At method operation 900, images of a real-world interactive environment including the HMD are captured by a camera. At method operation 902, inertial movements of the HMD are sensed by one or more inertial sensors of the HMD. At method operation 904, the current location of the HMD is determined based at least in part on one or both of the sensed inertial movements of the HMD and the captured images of the HMD.

At method operation 906, a motion vector is generated based at least in part on one or both of the sensed inertial movements of the HMD and the captured images of the HMD. At method operation 908, a future location of the HMD is predicted using the motion vector and the current location of the HMD. At method operation 910, one or more beamforming parameters of the transceiver, such as direction and/or angular spread, are adjusted based on the predicted future location of the HMD.

Though in the present disclosure, implementations have generally been described with reference to predicting a future location of the HMD and steering an RF beamforming direction towards the predicted future location, it should be appreciated that in some implementations, a specific future location is not necessarily determined. But rather, the adjustment of the beamforming direction in a predictive manner is achieved based on the various input parameters without specifically determining or identifying a particular future location. It will be appreciated that the beamforming direction in such implementations will be predictively steered in a manner based on the inputs that would be towards a predicted future location if such was determined.

Figure 10:
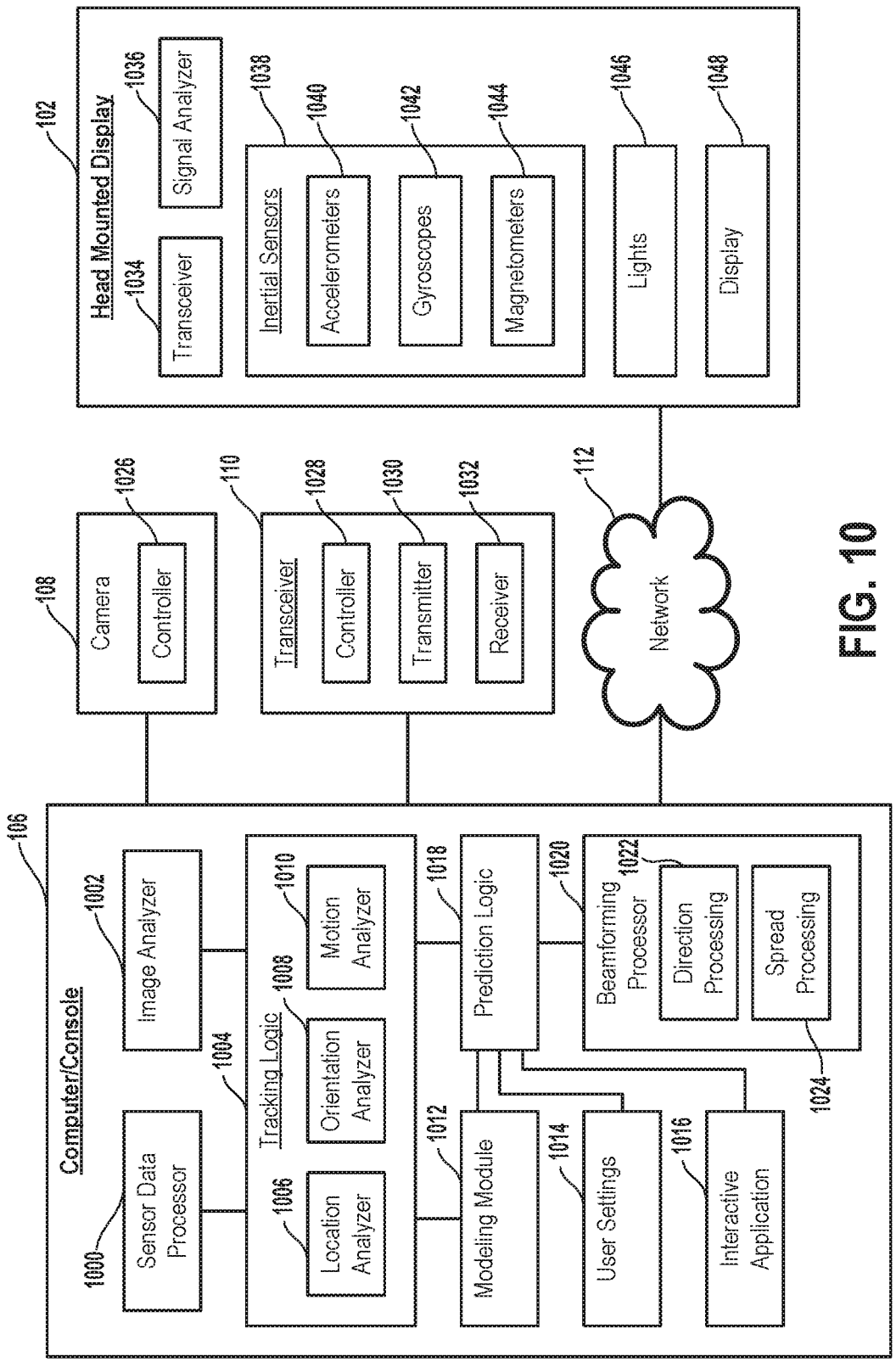
FIG. 10 conceptually illustrates a system for providing wireless communication between a computer and a HMD, in accordance with implementations of the disclosure.

FIG. 10 conceptually illustrates a system for providing wireless communication between a computer and a HMD, in accordance with implementations of the disclosure. The computer 106 is connected to a camera 108 and a transceiver 110. As noted, the camera 108 and the transceiver 110 may be part of the same device in some implementations, or separate devices in other implementations. The camera 108 includes a controller 1026 that is configured to process instructions received from the computer 106 to control the camera's operating parameters, e.g. aperture, sensor gain, etc. The transceiver 110 includes a controller 1028 that is configured to process instructions from the computer 106 to control the operation of the transceiver 110 including control of the transceiver's transmitter 1030 and receiver 1032. It will be appreciated that the transmitter 1030 and receiver 1032 can be configured to effect beamforming in accordance with the principles of the present disclosure.

Broadly speaking the computer 106 executes an interactive application 1016 (e.g. a video game) to generate video data (including image and audio data) that is wirelessly transmitted to the HMD 102 for rendering to the display 1048 of the HMD 102. The beamforming direction and/or spread of the transceiver 110 are adjusted so as to maintain wireless coverage and directionality towards the HMD. The HMD includes various inertial sensors 1038, for example including one or more accelerometers 1040, gyroscopes 1042, and magnetometers 1044. Data processed from the inertial sensors 1038 is communicated by the HMD to the computer 106, via transmission from the HMD's transceiver 1034 to the transceiver 110. The computer 106 includes sensor data processor 1000 that is configured to process the inertial sensor data from the HMD, e.g. to determine or identify movements of the HMD.

The camera 108 is configured to capture images of the interactive real environment in which the user operates the HMD. The captured images by the camera 108 are processed by the image analyzer 1002, e.g. to identify the HMD, such as by identifying lights 1046 of the HMD 102.

Tracking logic 1004 is configured to further analyze, and identify and/or quantify the location, orientation, and/or movement of the HMD. To this end a location analyzer 1006 is configured to determine the location of the HMD based on the inertial sensor data and the captured image data. An orientation analyzer is configured to determine the orientation of the HMD based on the inertial sensor data and the captured image data. A motion analyzer is configured to determine the motion of the HMD based on the inertial sensor data and the captured image data.

Prediction logic 1018 uses a model to predict a future location and/or movement of the HMD 102 based on various inputs such as the aforementioned location, orientation and movement of the HMD 102. In some implementations, the prediction logic 1018 uses additional inputs such as user settings 1014 or information from the interactive application 1016. For example, the interactive application 1016 may provide information regarding future expected locations or movements of the HMD, based on the current state of the interactive application. A beamforming processor 1020 is configured to determine beamforming parameters and adjustments thereto, based on the predicted future locations and/or movements of the HMD. A direction processing module 1022 is configured to determine the beamforming direction, and adjustments thereto, of the transceiver 110. A spread processing module 1024 is configured to determine the angular spread, and adjustments thereto, of the transceiver 110. The updated beamforming parameters are communicated to the controller 1028 of the transceiver 110, which effects adjustment of the parameters of the transceiver, such as steering/updating the beamforming direction to an updated direction, and/or updating the angular spread.

In some implementations, the HMD 102 includes a signal analyzer 1036 that is configured to evaluate the quality of the signal received from the transceiver 110. For example, signal analyzer 1036 may analyze the wireless signal from the transceiver 110 to determine its signal strength. This information can be provided back to the computer 106 as feedback, to enable evaluation of whether a strong signal is being maintained and the predictive adjustment of beamforming direction and angular spread is effective. In some implementations, the feedback data is provided via a separate communication channel and/or a separate communication protocol/context than that utilized for the transmission of the video data to the HMD 102. For example, in some implementations, the feedback data is transmitted over the network 112 from the HMD to the computer 106 (rather than being transmitted via the transceiver 110). By way of example, the network 112 may include a wireless router or other wireless networking device through which the HMD 102 wirelessly accesses the network 112. The computer 106 may also access the network 106 through either a wired or wireless connection.

The use of an alternate communications protocol/context for purposes of providing the feedback data is beneficial in case wireless connection via the transceiver 110 is lost, in which case an alternate path for communication back to the computer 106 is possible. It will be appreciated that the bandwidth requirement for the transmission of feedback data, and other types of data, can be significantly less than that required for transmission of video data. Thus, transmission of the feedback data over a communications context with less bandwidth (e.g. than that used to transmit video data to the HMD), for example a conventional WiFi network connection, can be sufficient for such purposes.

In some implementations, the transmission of feedback data occurs over a separate frequency band than that used for the wireless transmission of video data to the HMD. For example, the video data may be transmitted to the HMD over a 60 GHz frequency band, whereas the feedback data is transmitted over different frequency band, e.g. a 2.4 GHz or 5 GHz band. It will be appreciated that in such implementations, the transmitter 1030 of the transceiver 110 and the corresponding receiver of the HMD's transceiver 1034 are configured to operate at 60 GHz, whereas the receiver 1032 of the transceiver 110 and the corresponding transmitter of the HMD's transceiver 1034 are configured to operate at a different frequency band.

As has been noted, in some implementations beamforming is applied by the transceiver 110 for both transmission and reception purposes. However, in some implementations, beamforming can be applied selectively by the transceiver 110 for transmission only, while no beamforming is applied for reception. In this manner, communication from the HMD back to the transceiver is more likely to be maintained even if transmission to the HMD is compromised or lost (e.g. due to failure of the main lobe to adequately track the HMD). In other implementations, beamforming can be applied in different ways for transmission versus reception. For example, the angular spread of the beamforming for reception by the transceiver 110 may be configured to be greater than the angular spread of the beamforming for transmission by the transceiver 110. This can afford greater signal stability for receiving communication from the HMD (versus transmission to the HMD) while still providing some benefit in terms of reception directionality.

In still further implementations, the quality of signal reception by the transceiver 110 can serve as additional feedback data that is indicative of whether the beamforming direction of the transceiver is being effectively steered towards the HMD.

Implementations of the disclosure employ beamforming as a signal processing technique to achieve directional signal transmission and/or reception. Beamforming technology entails operation of a phased array of transmission or reception elements to purposely produce constructive interference in a desired direction and over a desired angular width. Beamforming can be used to achieve spatial selectivity for both transmission and reception. Broadly speaking, transmission beamforming entails control of the phase and relative amplitude of the signal at each of a plurality of spatially separated antennas, whereas reception beamforming entails combining signals received from such antennas that have been phase and amplitude adjusted. A basic discussion of beamforming can found with reference to "A Primer on Digital Beamforming," Toby Haynes, Spectrum Signal Processing, Mar. 26, 1998 (http://www.spectrumsignal.com/publications/beamform_primer.pdf), the disclosure of which is incorporated by reference.

Though implementations have generally been described with reference to use of inertial data and captured image data for purposes of determining location and movement of the HMD, it should be appreciated that the principles of the present disclosure can be applied with any known method for determining location/orientation and/or movement of an HMD. For example, in some implementations, the HMD includes one or more outward facing cameras which can be utilized for movement and position tracking, e.g. using simultaneous localization and mapping (SLAM) techniques as are known in the art. In some implementations, recognizable objects (e.g. emitters (e.g. RF, IR, visible spectrum, laser, ultrasonic, magnetic, etc.), lights, reflective objects, tags, shaped objects, patterns, etc.) can be positioned in the local environment to assist in such tracking. Such objects can be detected by appropriate sensors mounted on the HMD (e.g. camera, photo sensing diode, magnetic sensor, microphone, etc.). It will be appreciated that such sensors can include one or more sensors distributed about the HMD, or an array of sensors in a predefined configuration that can be operated in concert to enable localization and tracking of the HMD. Any known method for localization and tracking of the HMD can be applied to enable predictive RF beamforming in accordance with the principles of the present disclosure, to enable a fully wirelessly operated HMD. All such implementations are not described in detail herein, but will be readily apparent to those skilled in the art and understood as part of the present disclosure.

Figure 11A:
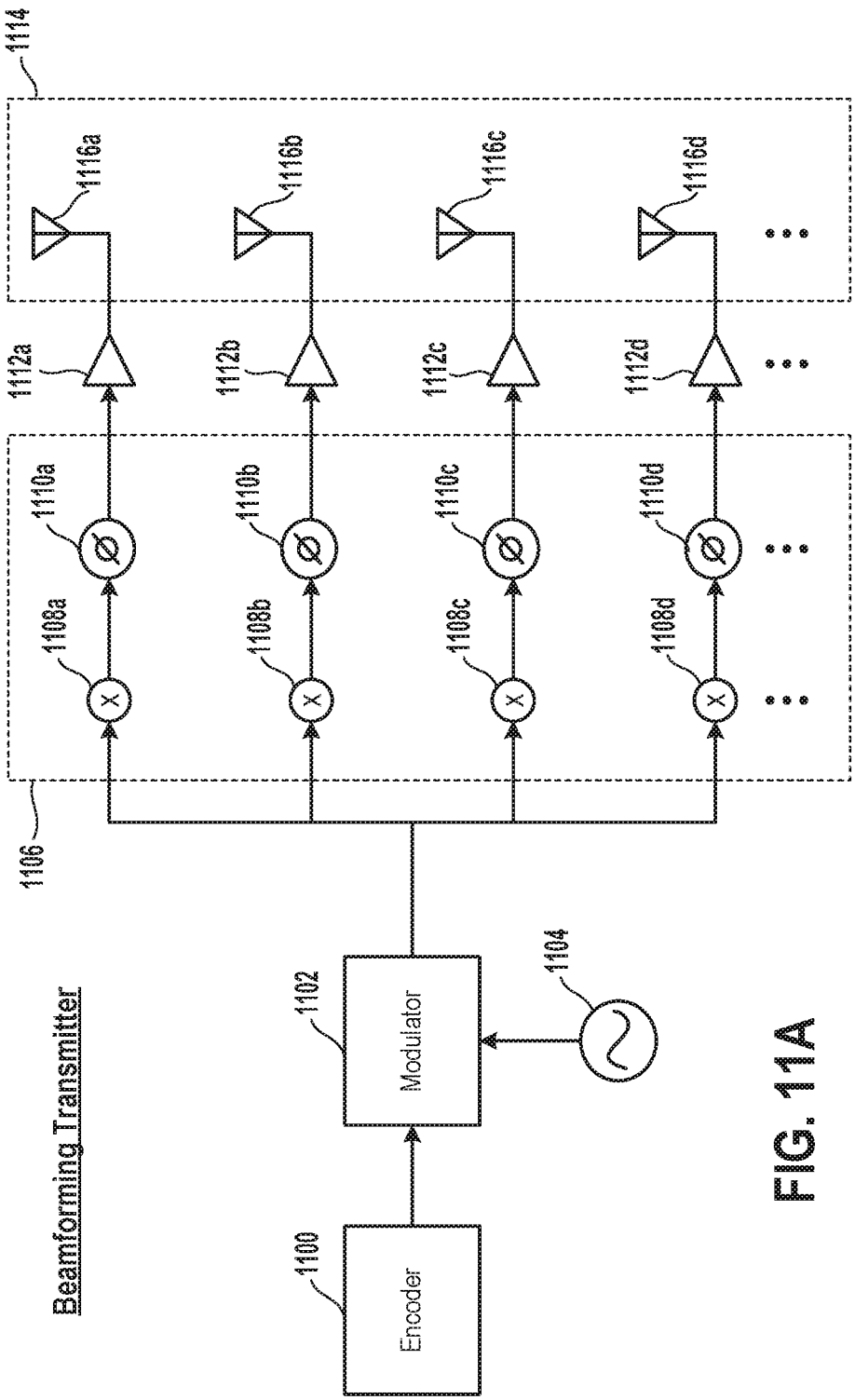
FIG. 11A is a schematic diagram showing components of a beamforming transmitter, in accordance with implementations of the disclosure.

FIG. 11A is a schematic diagram showing components of a beamforming transmitter, such as the transmitter 1030 of the transceiver 110, in accordance with implementations of the disclosure. An encoder 1100 is configured to receive and encode information for wireless transmission (e.g. video data for transmission to the HMD). The encoder 1100 may format or otherwise process the information for transmission, e.g. performing block encoding, compression, adding redundancy for error reduction, etc. A modulator 1102 transforms the encoded data into a waveform, for example by mapping binary digits to a carrier frequency (e.g. pulse amplitude modulation (PAM), phase-shift keying (PSK), etc.). In some implementations, a carrier frequency is generated by a carrier oscillator 1104. Though not specifically shown, in some implementations, the waveform generated by the modulator can be frequency upconverted and/or amplified.

The waveform is provided to a beamformer 1106, which feeds the waveform in parallel to a plurality of amplitude adjusters 1108a-d, and to a plurality of phase shifters 1110a-d. The amplitude adjusters and phase shifters enable individual adjustment/tuning of the amplitude and phase of the waveform for each antenna 1116a-d of an antenna array 1114. Corresponding amplifiers 1112a-d are provided to amplify the adjusted waveform for transmission via the antennas 1116a-d. The antennas 1116a-d of the antenna array 1114 are spatially arranged in a predefined configuration. As noted, the transmission of the phase and amplitude adjusted signals from the antennas of the antenna array produces a wavefront having a pattern of constructive and destructive interference that produces the desired beamforming effect.

Figure 11B:
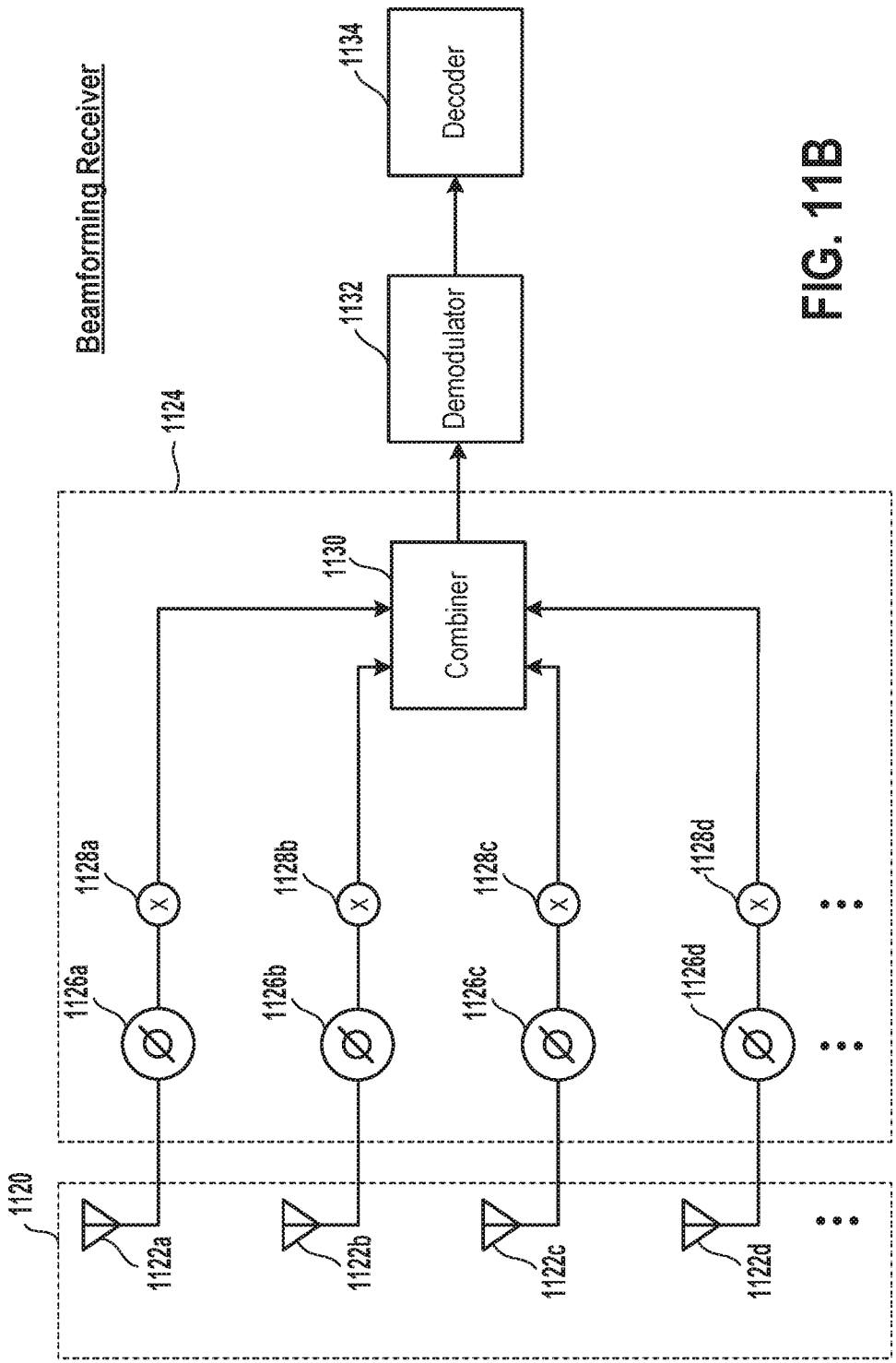
FIG. 11B is a schematic diagram showing components of a beamforming receiver, in accordance with implementations of the disclosure.

FIG. 11B is a schematic diagram showing components of a beamforming receiver, such as the receiver 1032 of the transceiver 110, in accordance with implementations of the disclosure. An antenna array 1120 includes a plurality of antennas 1122a-d. The signals received by the antenna array 1120 are fed to a beamformer 1124, which individually adjusts, for each antenna, the phase and amplitude of the received signal via a plurality of phase adjusters 1126a and amplitude adjusters 1128a. The adjusted signals are then combined via a combiner 1130, which may also amplify the combined signal. Though not specifically shown, in some implementations, the combined signal can be frequency downconverted and/or separately amplified.

A demodulator 1132 demodulates the combined signal to extract the encoded data, and a decoder 1134 decodes the encoded data to extract the original information.

In some implementations, the antenna array 1114 (transmitter antenna array) and the antenna array 1120 (receiver antenna array) are separate devices. However, in other implementations, the antenna arrays 1114 and 1120 are the same device, with, for example, a diplexer configured to divert transmission and reception signals appropriately. In various implementations, the antenna arrays may be microstrip/patch antenna arrays or other types of antenna arrays having a plurality of antennas positioned in a predefined configuration to enable beamforming in accordance with the principles of the present disclosure. Patch antennas as are known in the art may have tens to hundreds of individual antenna elements.

In some implementations, wireless communication in accordance with the principles of the present disclosure (e.g. for transmission of video data to an HMD) occurs over a 60 GHz frequency band. In some implementations, wireless communication takes place over other frequency bands, and may further utilize a combination of different frequency bands.

Figure 12A:
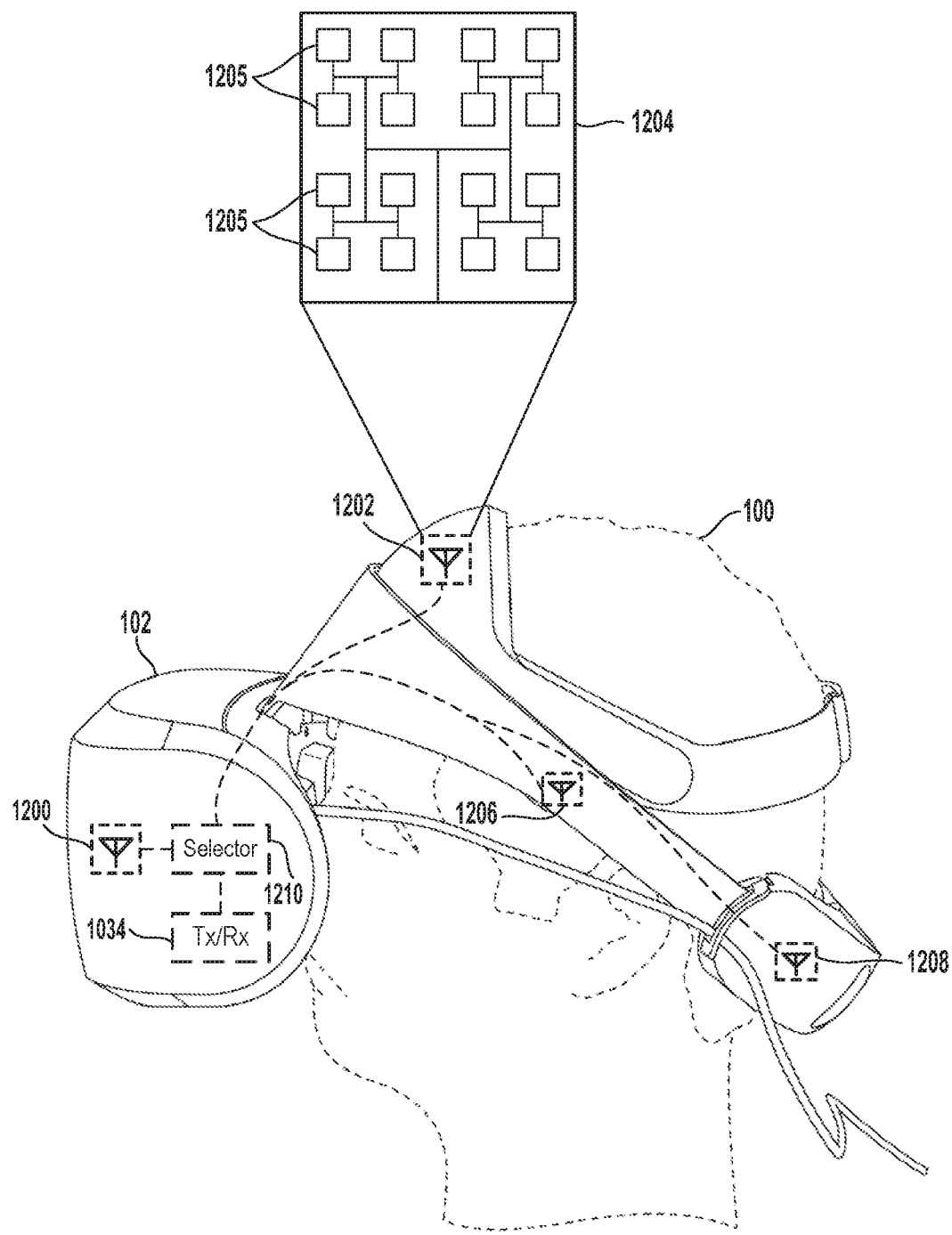
FIG. 12A conceptually illustrates a HMD having a plurality of antenna arrays, in accordance with implementations of the disclosure.

FIG. 12A conceptually illustrates a HMD having a plurality of antenna arrays, in accordance with implementations of the disclosure. As shown, the HMD includes an antenna array 1200 positioned at the front of the HMD 102, an antenna array 1202 positioned at the top of the HMD 102, an antenna array 1206 positioned at a side of the HMD 102, and an antenna array 1208 positioned at the rear of the HMD 102. The antenna arrays are connected to a selector 1210 that governs which of the antenna arrays is active for purposes of signal reception and/or signal transmission by the transceiver 1034. As the user 100 moves in the interactive real environment, the HMD's location and orientation may change, thereby changing which of the antenna arrays is optimally positioned. In some implementations, the optimally positioned antenna array may be the antenna array that is nearest to the transceiver or which offers the best line-of-sight to the transceiver. Accordingly, the selector 1210 can be configured to switch between the various antenna arrays, selecting the one that is most optimally positioned. In some implementations, the selector 1210 is configured to continuously measure the reception signal strength from each of the antenna arrays 1200, 1202, 106, and 1208, and determine which provides the highest signal strength, and if necessary, then switch from using a current one of the antenna arrays to using the antenna array that provides the highest signal strength.

Shown at ref. 1204 is an expanded representation of one antenna array. Each antenna array can include multiple individual antenna elements 1205.

FIGS. 12B, 12C, and 12D illustrate overhead views of an HMD in an interactive real environment, illustrating switching of active antenna arrays on an HMD, in accordance with implementations of the disclosure. At FIG. 12B, the front of HMD 102 is facing towards the transceiver 110. In accordance with implementations of the disclosure, the transceiver 110 has a beamforming direction 1220 that is directed towards the antenna array 1200, which is the currently active antenna array of the HMD, from which received signals are processed to extract/decode video data for rendering on the HMD. The additional antenna arrays 1206a, 1206b, and 1208 are currently in an inactive state, meaning that signals received from these antenna arrays are not specifically processed for video rendering as is the case for the antenna array 1200. However, the signals of the antenna arrays 1206a/b and 1208 may still be monitored to, for example, determine their signal strength to determine which of the antenna arrays is optimally positioned at a given moment.

At FIG. 12C the HMD has rotated in a clockwise direction, thus moving the antenna array 1200. The transceiver is accordingly adjusted to have a beamforming direction 1222 that is towards the antenna array 1200, and may have been predictively steered in accordance with the principles discussed herein. The antenna array 1200 remains as the active antenna array, while the others are inactive.

However, at FIG. 12D, the HMD 102 has rotated to a point wherein the antenna array 1206a is now the nearest, and provides the most unobstructed line-of-sight, to the transceiver 110. Therefore, the active antenna array is switched from the antenna array 1200 to the antenna array 1206a. Additionally, the beamforming direction of the transceiver is redirected towards the newly active antenna array 1206a instead of the array 1200.

It will be appreciated that in some implementations, the orientation of the HMD in the interactive environment (e.g. relative to the transceiver) can be determined using the inertial data and captured image data as previously described. The orientation of the HMD can then be utilized to determine which of the antenna arrays is most optimal for signal reception by the HMD. Additionally, the presently described antenna switching scheme can be performed in a predictive manner, such that antenna arrays are activated or deactivated based on predicted future orientations of the HMD.

Figure 13:
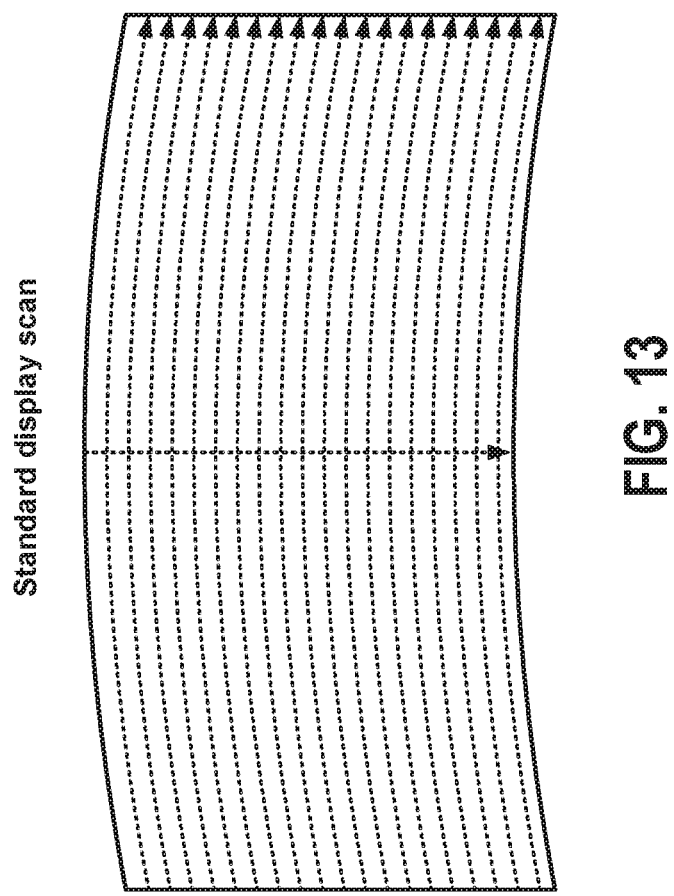
FIG. 13 illustrates the refreshing of the display (e.g. of an HMD), in accordance with implementations of the disclosure.

FIG. 13 illustrates the refreshing of the display (e.g. of an HMD), in accordance with implementations of the disclosure. In many displays, the content of the display is rendered, also referred to as scanned out or refreshed or updated, in lines. One line at a time is rendered, in order from top to bottom. Within each line, the pixels associated with the line are refreshed from left to right. This type of rendering provides the same refresh frequency for all the pixels on the display.

Implementations presented herein define different regions within the display, and the pixels in each of the regions are given different rendering priority. The rendering priority determines how the pixels are displayed. In one implementation, the higher the rendering priority for a pixel is the more frequent the pixel will be refreshed.

As used herein, a rendering policy for an identified region on the display determines how the identified region is scanned out. The rendering policy includes one or more values (or image quality settings) that identify how the region is to be displayed. In one implementation, the rendering policy includes one or more of a frequency of screen updates for the region (e.g., 30 times a second, but other values are also possible), a rendering resolution, complexity of rendering imagery in the region, a rendering order value, or other settings which may affect image quality and/or the amount of image data used to render the user's view.

The rendering resolution determines if all the pixels in a region will be refreshed individually. At the maximum resolution, (e.g., 100%) all the pixels in the region will be refreshed with individual values for color and brightness. However, sometimes the resolution of the region will be lowered (e.g., 64%) which means that only some of the pixels in the region are refreshed each pass. For example, at a rendering resolution of 50%, half of the pixels in the region will be refreshed in one cycle, and the other half will be refreshed in the next cycle.

The complexity of rendering imagery in the region is based on an amount of processing required to generate the pixel values for pixels in a region. For example, a background region with a uniform color, or a region that is filled with pixel values from a background image, will be less complex to render than a region that includes a moving avatar. Depending of some attributes of the avatar, the complexity may greatly increase, such as when the avatar includes long free-flowing hair, the avatar is an animal with fur, etc. Further, a region that includes a mirror may also have complex processing to determine the pixel values, as the image on the mirror will depend on the gaze of the user, and calculations may be needed to determine where the mirror is aiming.

In another implementation, the definition of a region is changed by lowering the number of memory cells used to store pixel information. In this case, if the definition of a region is below the maximum, the memory used to store pixel data is reduced accordingly. For example, a region with a definition of 25% uses only 25% of the memory associated with 100% definition. This means that the same pixel data is used to scan groups of four pixels in the region.

In addition, the display technology can upscale the source memory associated with a region to fill the pixel region. In other implementations, different methods for up-scaling or down-scaling may be used, such as nearest-neighbor interpolation, nearest-neighbor with mipmapping, bilinear filtering, trilinear filtering, or anisotropic filtering.

For example, bilinear filtering is a texture filtering method for smoothing textures when displaying a first plurality of pixels on an area of a display using a second plurality of pixels, where the number of pixels of the second plurality of pixels is different than the number of pixels in the first plurality of pixels. In other words, the second plurality of pixels requires a scaling (up or down) of the first plurality of pixels.

Many times, when drawing a textured shape on the screen, the texture is not displayed exactly as it is stored, without any distortion. Because of this, most pixels will end up needing to use a point on the texture that is between texels (unit of texture space), assuming the texels are points situated somewhere in their respective cells. Bilinear filtering uses these points to perform bilinear interpolation between the four texels nearest to the point that the pixel represents (in the middle or upper left of the pixel, usually).

By lowering the resolution or the definition in one region, computing resources may be allocated to other regions on the screen that are more critical to provide a better experience for the user.

The rendering order value is a value assigned by the computing device to define the order in which the regions are rendered. In one implementation, the computing device provides a rendering order value to each of the regions, and then all the regions are scanned out in the order defined by the rendering order value. In other words, the computing device creates a sorted list of all the regions for rendering.

In one implementation, one or more rendering rules define the rendering policy. For example, the rendering policy may include one rule (e.g., display pixels from left to right and from top to bottom), or may include two or more rules. For example, a first rule may define that regions in the center of the display will have higher priority than regions in the periphery of the display, and a second rule may define that regions with game characters have a higher rendering priority that regions without game characters.

Figure 14:
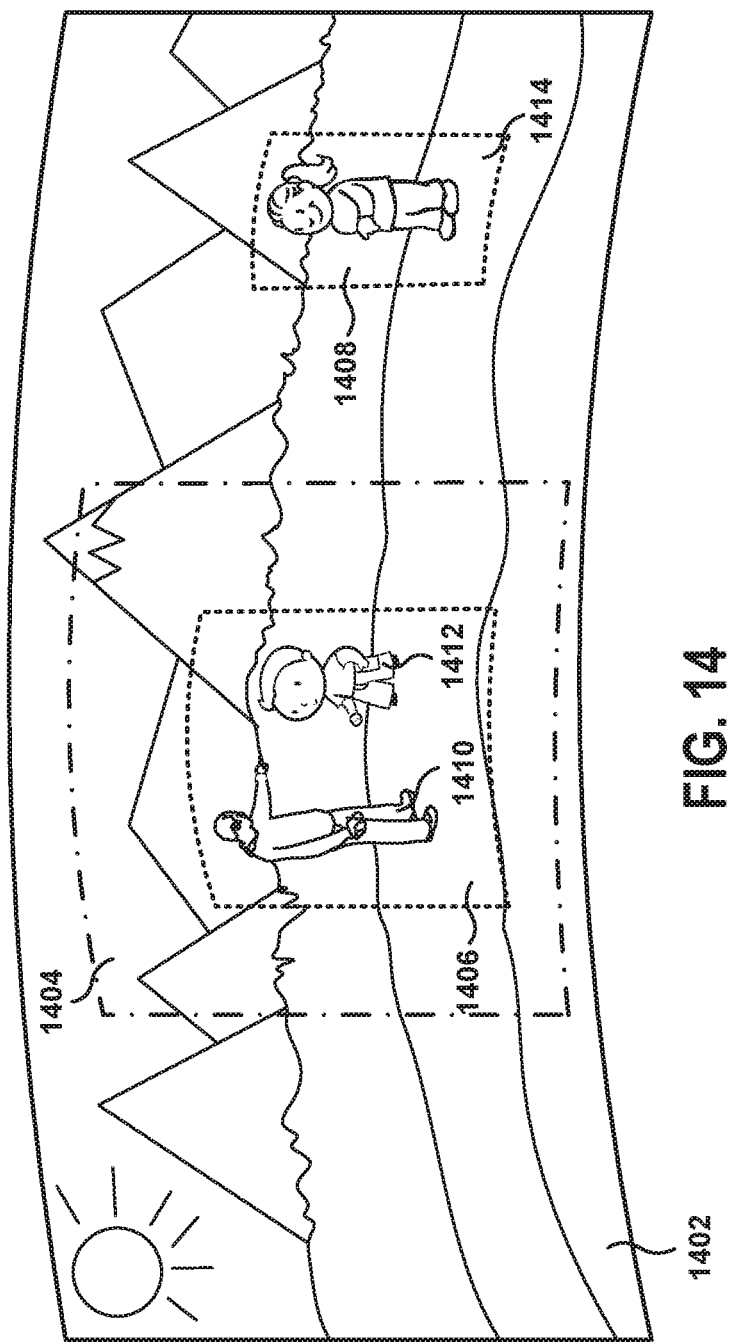
FIG. 14 illustrates a game scene shown on the display of an HMD, in accordance with implementations of the disclosure.

FIG. 14 illustrates a game scene shown on the display of an HMD, in accordance with implementations of the disclosure. In some implementations, gaze tracking and HMD motion tracking are used to prioritize the scanning out of different regions on the HMD display 1402.

In one implementation, the screen is partitioned into a plurality of regions or sections, and the regions are updated with different priorities and with different levels of resolution. This means that some regions may be refreshed more frequently than others or with a higher resolution.

The HMD tracking assists in determining where the user is going to project their gaze, because when the user is going to change their gaze there is a natural instinct to move the head in the same direction, even though the movement of the head may be slight when compared to the movement of the eyes. For example, if a user is looking straight ahead and the head (together with the HMD) starts moving towards the left, the computing device projects that the user is going to move their gaze to the left. In response to this detection, the areas on the left of the screen are rendered with higher priority than the areas on the right side of the screen. In fact, it is very probable that the areas towards the right border of the screen will disappear from view as the scene shifts towards the left.

By prioritizing the scanning out of the different regions, it is possible to give a better experience to the user by focusing on where the user is looking, or where the user is going to look next, and more efficiently apply computer resources to enable rendering the user's view faster and with better quality.

It will be appreciated that when video data is wirelessly transmitted to the HMD in accordance with implementations described herein, it is all the more important to efficiently utilize the available wireless transmission bandwidth, as the bandwidth may be limited and/or may change depending upon the movements of the user. Thus, the prioritized rendering methods described herein enable more efficient data usage which can improve the overall user experience, e.g. enabling higher frame rates and/or fewer dropped frames for a smoother viewing experience.

HMD motion tracking is important, because sometimes it is faster to detect HMD motion than gaze motion. In some cases, the computing device tracking visually the HMD has more computing resources than the HMD, so the computing device is able to detect the HMD motion and predict a trajectory of the HMD based on the HMD motions. Additionally, the HMD provides information to the computing device regarding the current location of the gaze, and the computing device is able to combine both sources of information in order to better predict the trajectory of the gaze.

FIG. 14 shows a screen of a virtual reality game. Implementations presented herein are described with reference to virtual reality displays, where the screen shows exclusively scenes created by a computing device. However, the principles presented herein may also be applied to augmented reality games, where the view on the screen is a combination of real-world images and computing-device generated images. In one implementation, the game is played on an extensive virtual world. The user sees only a part of the virtual world at any time, and the user is able to move around the virtual world. As the user moves around the virtual world, other parts of the virtual world are exposed.

In some implementations, the current user's viewpoint 1404 is given a higher rendering priority than regions outside the user's viewpoint 1404. The user's viewpoint is defined as an area on the display where the user is focusing its view. Therefore, most of the game interactions occur within the user's viewpoint 1404. Of course, the gaze of the user is centered around the viewpoint 1404.

Many people are able to see within their field of view an area that goes from about 90° to the left to about 90° to the right. However, the areas on the periphery of the user's vision are not perceived clearly, although a person may feel some motion or changes within those periphery areas.

In the implementation shown in FIG. 14, the viewpoint is defined as a rectangular section on the screen, where the gaze of the user is centered within this rectangular section. However, other types of viewpoint areas may be defined. For example, in one implementation the viewpoint area is defined as a circle around the gaze point of the user on the screen. A viewing angle is defined with reference to a line from the midpoint between the eyes to the gaze point on the screen. The radius of the viewpoint circle is then determined by the viewing angle. In some implementations, the viewing angle may have values in the range of 5° to 45°, but other values are also possible.

In some implementations, the rendering policy requires that regions with game characters are given higher rendering priority than regions without game characters. In other implementations, another rendering policy gives higher scan out priority to game characters and special game objects ranked as important game objects by the game. For example, an important game object may be an exit door, a navigation console in a car or plane, a target on a soothing game, an enemy aircraft, etc. In general, an important game object is an object that can be acted upon by the user, while non-important game objects are rendered in the background to fill out the scene.

In FIG. 14, region 1406 (including game characters 1410 and 1412) and region 1408 (including game character 1414) are regions with game characters and are given a higher rendering priority than the rest of the display. Of course, in some implementations this is only a factor in calculating the final rendering priority, as the rendering priority may be altered by some other rules, such as when the user is moving their gaze or their head.

In one implementation, blurring on the screen may occur when the user moves their head fast because the fast motion requires a fast update of the display, and the HMD may not have enough computing resources to keep up with the motion of the user. In order to avoid blurring while the HMD is in fast motion, the rendering policies start refreshing faster the regions associated with the motion of the user, and some other regions might be refreshed at lower frequency or with lower resolution. Once the HMD stops moving, the higher quality of the scanned out image is restored.

Further, it is noted that in order to predict the trajectory of the gaze of the user, the computing device tracks the trajectory of the gaze of the user over a predetermined period of time, and also tracks the trajectory of the HMD over the predetermined period of time (or some other period to time). The historical data is used to predict the trajectory of the gaze of the user by analyzing the trend in the gaze motion and in the HMD motion.

It is noted that the implementations illustrated in FIG. 14 are exemplary. Other implementations may utilize different types of viewpoint areas, different types of displays, different rendering policies, etc. The implementations illustrated in FIG. 14 should therefore not be interpreted to be exclusive or limiting, but rather exemplary or illustrative.

Figure 15:
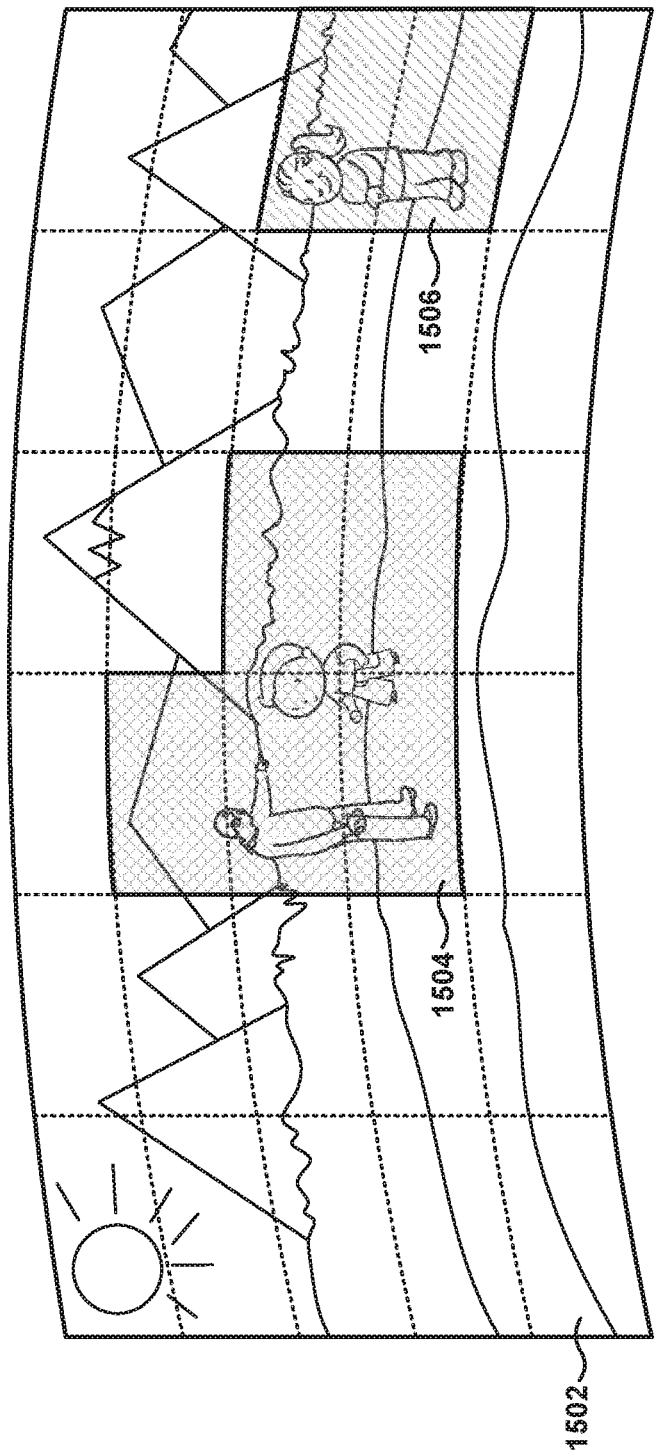
FIG. 15 illustrates the creation of regions in the display for prioritized rendering, in accordance with implementations of the disclosure.

FIG. 15 illustrates the creation of regions in the display for prioritized rendering, in accordance with implementations of the disclosure. In the implementation of FIG. 15, a plurality of regions of equal size is defined on the screen 1502. In the exemplary implementation, a grid is defined on the screen that creates 30 regions (6×5). In other implementations, the regions defined on the screen do not have equal size. For example, the regions on the center of the display are smaller than the regions on the outside of the display, as typically the regions on the center are more important to provide a better user experience. Consequently, these center regions are given higher rendering priorities.

In some implementations, some of the regions are given a higher priority for rendering based on game activities or based on what the user is doing. For example, as discussed above with reference to FIG. 6, motions of the head of the user are detected and used to increase the priority of the regions where the gaze of the user is predicted to be.

In one implementation, regions with game characters are given higher priority than regions without game character. In the exemplary implementation of FIG. 15, the regions inside areas 1504 and 1506 include parts of game characters. In one implementation, the rendering policy includes a rule that increases the priority for rendering of regions 1504 and 1506. Another rendering policy gives high rendering priority to regions in the center of the screen and low rendering priority to regions in the periphery of the display.

In one implementation, the rendering policy for each region is calculated by considering a plurality of factors or rules that determine the priority. The following equation is used to determine the rendering policy rp value for region $r_i$:

$$rp(r_i)=f(rule_1(r_i), rule_2(r_i), \ldots, rule_n(r_i))$$

Where $rp(r_i)$ is the rendering policy for region $r_i$, and $rule_1$-$rule_n$ are the policy rules defined for determining the rendering policy. For example, one rule may dictate the regions in the center of the display are given higher rendering priority, a second rule may determine that regions with game characters are given higher rendering priority, a third rule may give higher priority to a region around the point of gaze, a fourth rule may determine that when the user is moving their head the regions where the head is predicted to turn are given higher rendering priorities, etc.

In one implementation, the rendering policy includes one or more of a frequency of screen updates for the region, a rendering resolution, and a rendering order value. In one implementation, each rule is given a weight in order to calculate the rendering policy for the region. In some implementations, the weights may be dynamically adjusted based on past experience.

Figure 16:
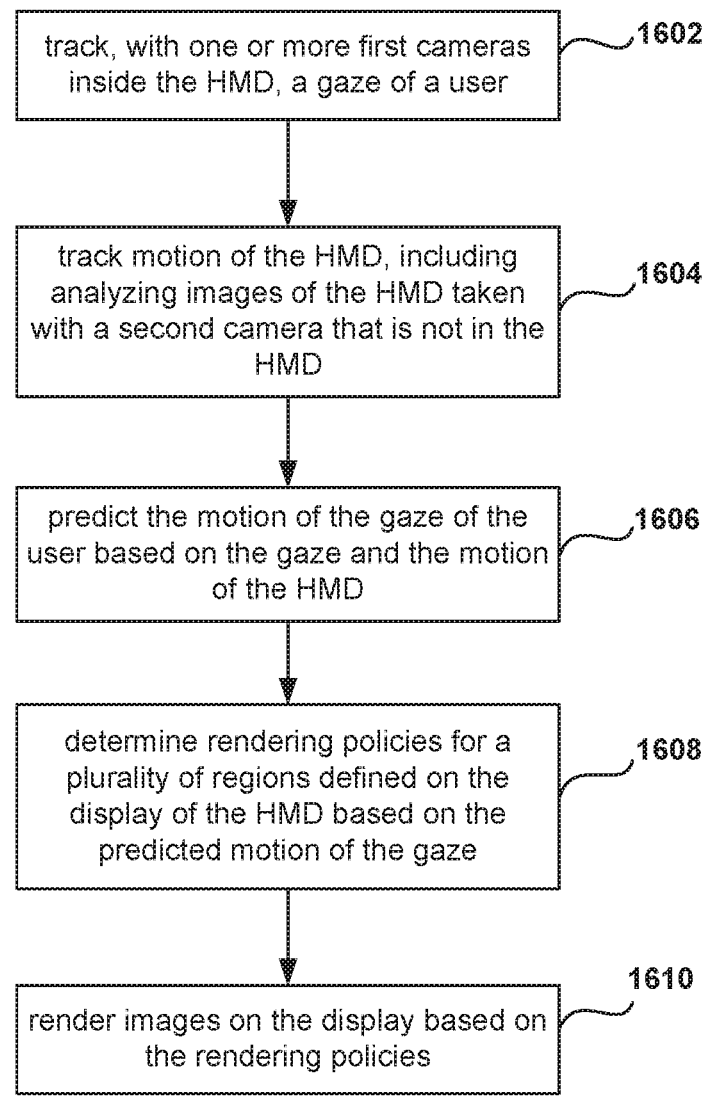
FIG. 16 is a flowchart for rendering images on the HMD, in accordance with implementations of the disclosure.

FIG. 16 is a flowchart for rendering images on the HMD, in accordance with implementations of the disclosure. While the various operations in this flowchart are presented and described sequentially, one of ordinary skill will appreciate that some or all of the operations may be executed in a different order, be combined or omitted, or be executed in parallel.

In operation 1602, the method tracks, with one or more first cameras inside the HMD, the gaze of the user. From operation 1602, the method flows to operation 1604 where the method tracks the motion of the HMD. Tracking the motion includes analyzing images of the HMD taken with a second camera that is not in the HMD (e.g., camera 108 in FIG. 1).

From operation 1604, the method flows to operation 1606 where the motion of the gaze of the user is predicted (e.g., the predicted trajectory of the gaze) based on the gaze and the motion of the HMD. Further, from operation 1606 the method flows to operation 1608 where rendering policies for a plurality of regions defined on the display of HMD are determined. The rendering policies are determined based on the predicted motion of the gaze.

From operation 1608, the method flows to operation 1610 to render images on the display based on the rendering policies previously calculated. In addition, in one implementation the rendering resolution for a region is decreased when the HMD is moving, and the rendering resolution of the region is increased when the HMD becomes stationary.

In some implementations, inertial information is received regarding the motion of the HMD, the inertial information being captured by inertial sensors in the HMD. In another implementation, the motion of HMD is tracked by analyzing images of the HMD taken with a second camera that is not in the HMD. In yet another implementation, the motion of the HMD is tracked by combining inertial information with results from the image analysis of images taken with the second camera.

In yet another implementation, a method for rendering images on a HMD is presented. The method includes an operation for tracking the gaze of a user looking at the view created by a display inside the HMD. Further, the method includes an operation for assigning rending priority values for a plurality of game objects being rendered on the display based on the gaze of the user. The rendering priority value for each game object defines the frequency of rendering and the rendering resolution. In addition, the method includes an operation for changing the rendering priority values based on an importance value of each game object in the game. In another operation, the method renders the plurality of game objects on the display according to the rendering priority values.

In another implementation, the actual source imagery is altered based on the source imagery and the region where the source imagery is being rendered. For example, a game character is rendered with more detail when the game character is under direct gaze (e.g., the game character is near the center of the user's field of view) than when the game character is not under direct gaze (e.g., the game character is not near the center of the user's field of view).

Sound localization refers to a listener's ability to identify the location or origin of a detected sound in direction and distance. It may also refer to the methods in acoustical engineering to simulate the placement of an auditory cue in a virtual 3D space. The human auditory system uses several cues for sound source localization, including time and level differences between both ears, spectral information, timing analysis, correlation analysis, and pattern matching.

Humans have two ears, but can locate sounds in three dimensions—in range (distance), in direction above and below, in front and to the rear, as well as to either side. The brain, the inner ear, and the external ear work together to make inferences about location. Humans estimate the location of a source by taking cues derived from one ear (monaural cues), and by comparing cues received at both ears (difference cues or binaural cues). Among the difference cues are time differences of arrival and intensity differences. The monaural cues come from the interaction between the sound source and the human anatomy, in which the original source sound is modified before the sound enters the ear canal for processing by the auditory system. These modifications encode the source location, and may be captured via an impulse response which relates the source location and the ear location. This impulse response is termed the head-related impulse response (HRIR). Convolution of an arbitrary source sound with the HRIR converts the sound to that which would have been heard by the listener if the sound had been played at the source location, with the listener's ear at the receiver location. HRIRs can be used to produce virtual surround sound.

A sound localization function $f$ (also known herein as a sound function, a localization function, and sometimes plainly as a "function") is a function or algorithm that generates a localized sound based on a sound and the location in space perceived as the origin of the sound. The localized sound, when played through speakers, gives the impression to the listener that the sound originated in the desired location, even though the sound is really originating at the speakers. The function $f$ can be mathematically expressed as:

$$ls = f(s, l) \quad (1)$$

Where s is the sound (e.g., a dog bark), l is the location where the sound is supposed to originate, and ls is the localized sound. One example of a sound localization function is a Head-Related Transfer Function (HRTF), which is a response that characterizes how an ear receives a sound from a point in space. A pair of HRTFs for the ears may be utilized to synthesize a binaural sound that seems to come from a particular point in space. The HRTF can also be described as the modifications to a sound from a direction in free air to the sound arriving at the eardrum. These modifications include the shape of the listener's outer ear, the shape of the listener's head and body, the acoustical characteristics of the space in which the sound is played, and so on. All these characteristics influence how a listener can accurately tell what direction a sound is coming from. Due to the physical differences of each person, each person has a different HRTF. Implementations of the invention for sound localization are described using HRTF, but any other form of sound localization that accounts for the physical characteristics of a listener can be utilized with implementations of the invention.

Figure 17:
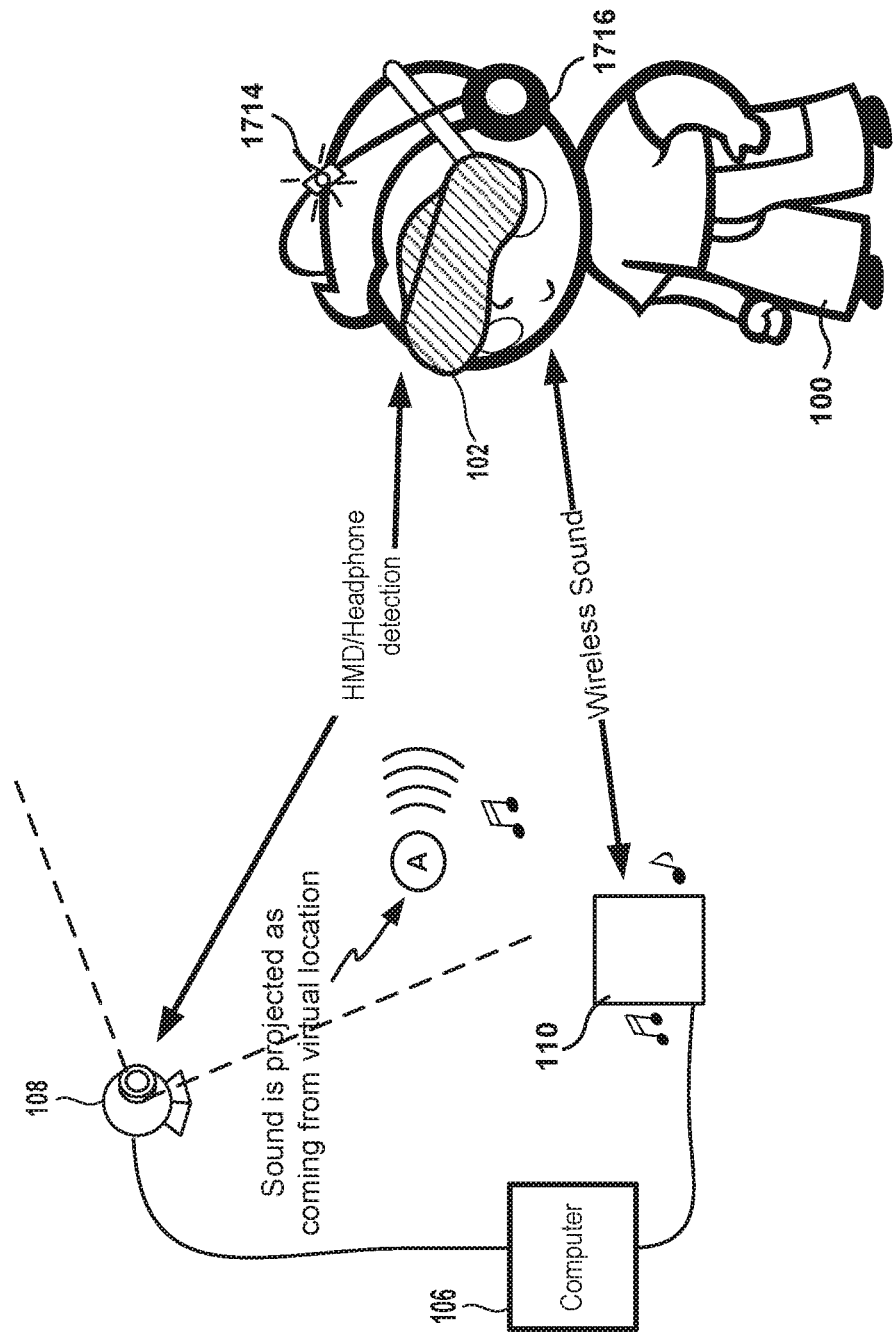
FIG. 17 illustrates an implementation where the sound delivered at headphones is modified.

FIG. 17 illustrates an implementation of the invention, where the sound delivered at headphones 1716 is modified, such that user 102 perceives the sound delivered by the headphones 1716 as if the sound was emanating from a virtual location "A," instead of perceiving the sound coming directly from the headphones 1716. The location of the HMD 102 and/or the headphones 1716 (also referred to as headset, earphones, or earpiece) in the local interactive environment is tracked. It will be appreciated that the location of the headphones may be deduced or inferred from tracking the HMD in some implementations. Once the location of the headphones is known, the computer 106 manipulates the sound (e.g., using the user's HRTF) to generate localized sound in order to make the user believe that the sound is coming from the virtual location A.

In the implementation shown in FIG. 17, the localized sound (in the form of audio data/signal) is transmitted wirelessly for rendering by the headphones 1716, which may be wireless or wired. In some implementations, the audio data/signal is wirelessly transmitted to the HMD 102, which may then transmit the audio data/signal to the headphones 1716 (e.g. via a wired connection) to render the sound. In some implementations, the audio data/signal is further processed by the HMD 102 before transmission to the headphones. For example, the wirelessly transmitted audio data received by the HMD may be digitally encoded in a compressed audio format, to reduce wireless bandwidth requirements for the audio. The HMD 102 may therefore decode the encoded audio data to generate an analog audio signal that is transmitted to the headphones. Once the localized sound is played by the headphones 1716, the user perceives the sound as coming from the virtual location A.

In other implementations, the audio data/signal is wirelessly transmitted directly to the headphones, using a separate wireless transmission signal than that for the HMD. In such implementations, image data and audio data are separately transmitted to the HMD 102 and the headphones 1716, respectively, using separate transmission signals. However, it will be appreciated that the beamforming techniques which are described herein can be applied to both.

Different people have different HRTF's, and the most compelling experience is delivered when that HRTF of the user is utilized. In one implementation, a standard HRTF is utilized when the HRTF for the user is not available. The standard HRTF takes into account the average characteristics of a human being. Although the HRTF of the user is not utilized, the standard HRTF can still provide a realistic experience for the user. In addition, calibration methods can be utilized to further customize the sound localization experience for the particular user to develop an HRTF for the user.

There are multiple ways for tracking the position of the headphones, which in turn define the position of the user's ears. In general, we refer to herein as tracking the location of the user's ears, because the location of the ears determines how the sound is to be localized. For ease of description, we refer to herein sometimes to tracking the location of the user, tracking the location of the head of the user, tracking the location of the HMD or tracking the location of the headphones that the user is wearing. All these methods of tracking are equivalent, as the location of the ears can be deduced from the location of the head, the user, the HMD or the headphones.

In the implementation of FIG. 17, headphones 1716 can include a source of light, such as Light-Emitting Diodes (LED) 1714. Camera 108 captures images of the space where user 100 is situated, and computer 106 then performs image analysis to determine the location of LED 1714. The brighter spot in the image assists in the identification of the location of the LED. In addition, the distance from the camera 108 to the headphones is estimated based on the size of the LED 1714 in the images taken by camera 108. Once the location of the LED 1714 is determined, the location of the user's ears is estimated by assuming that the LED is situated between the ears and a few inches above the line that connects the ears, according to the physical characteristics of the headphones.

It is noted that the implementation illustrated in FIG. 17 is exemplary. Other implementations may utilize different methods for tracking the location of the user's ears, or a combination of tracking methods can be utilized to increase accuracy. For example, location tracking can be performed using face recognition, ultrasound communication, RFID, infrared lights, Global Positioning System (GPS), etc. The implementation illustrated in FIG. 17 should therefore not be interpreted to be exclusive or limiting, but rather exemplary or illustrative.

Sound projection provides a compelling experience for the user, making the headphones "disappear" out of the listening experience. The user does not feel that the sound is coming from two speaker elements situated around the ears, but rather that the sound is coming from a particular point in space, which, depending on the situation, can be associated with the portable device, virtual elements from a game, a virtual user, etc. As the virtual source of sound changes or as the position of the user changes, the sound projection adapts so the sound appears to be emanating from the correct location.

Figure 18:
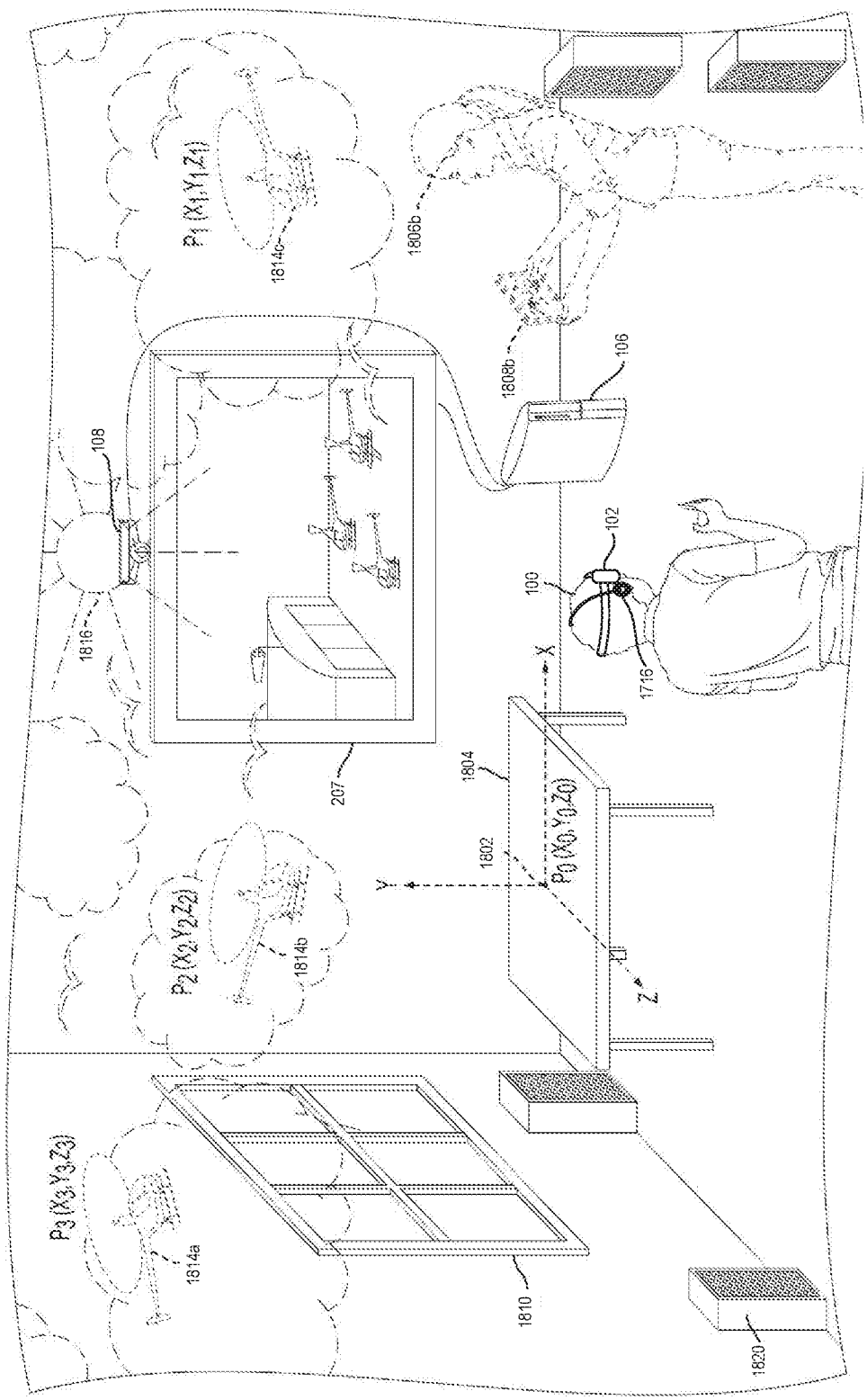
FIG. 18 illustrates a user viewing a VR environment via an HMD with realistic delivery of sound, in accordance with implementations of the disclosure.

FIG. 18 illustrates a user viewing a VR environment via an HMD with realistic delivery of sound, in accordance with implementations of the disclosure. Although player 100 is inside a room, the virtual reality, also referred to herein as the virtual scene, may extend beyond the physical boundaries of the room. A reference point 1802 for the virtual scene is located on top of table 1804. In one implementation, point $P_0$ 1802 is the reference point and is also the coordinate origin with coordinates ($X_0$=0, $Y_0$=0, $Z_0$=0). Player 1806*b* is playing the same game as player 100 but in a remote location, and player 1806*b* is represented as a virtual element in the game for player 100. Player 1806*b* is holding portable device 1808*b*, which has been synchronized to another reference point in the physical space where player 1806*b* is situated.

In one example implementation, the virtual scene is tied to the reference point because the geometry of the virtual scene (as seen through a screen of the HMD) is based, at least in part, on the reference point. For example, the coordinates of the virtual objects in the virtual scene may be determined with respect to the reference point.

The coordinates can be measured using any standard of measure. However, to provide a visual example, and without limitation on actual coordinates used, if the coordinates of the virtual scene are measured in meters, an object with coordinates (1, 0, 0) would be situated one meter to the right of the reference point. Of course, the coordinates of objects, real or virtual, may be dynamically updated as the scene changes, such as when a virtual object moves within the scene. In addition, the changes can be defined by actions set by the computer (e.g., interactive program), driven by actions of the user, or combinations of both. Additionally, for sake of clarity, the interactive program can be any type of program, such as a video game, a business program, an internet interface, or simply a graphical user interface that provides access to data, to other users, to programs, or to objects that may or may not be displayed or projected by a speaker.

Further yet, other implementations may have different coordinates systems or use scaling. For example, the coordinate system, instead of being a Cartesian system, can be polar, spherical, parabolic, etc. Additionally, the reference point does not have to be the origin of the coordinate system, and can be positioned at a different place. For sake of providing an example, the reference point can be located at coordinates (5, 5, 5) to enable a buffer of 5 meters in each direction before having to use negative coordinate values in points beyond the 5 meters. In another scenario, the virtual objects are built to scale and the coordinates are also measured in a scale. For example, the virtual objects may be built on a scale of 1:10, and the geometric axis can also have a scale of 1:10, such that an object with coordinates (1, 0, 0) is 1 meter away in the "real" world and 10 meters away in the virtual world.

In FIG. 18, virtual objects include helicopters 1814*a*-1814*c*, clouds, birds, sun 1816, etc. As players 1806*a* moves portable device 1808*a*, the view of the virtual scene changes as if the player were holding a camera into the virtual world. It should be noted that the view shown in device 408*a* may include or may not include the reference point. The room includes other static objects besides table 1804, such as television 1812 and window 1810.

As seen in FIG. 18, the virtual objects can be located anywhere in space. When the portable device includes a camera, the static features in the room can be used by the portable devices to maintain an accurate measurement of the current position by adjusting their inertial measurements with the views from their cameras. Image analysis in the portable device can detect the edges of a window, a light source, the edges of the table, a painting on the wall, a television, etc.

Computer/game console 106 exchanges information with portable device 408*a* to deliver the augmented reality environment. The information includes one or more of game information, user tracking, portable device location, virtual object location, remote player location, etc.

In one implementation, game console 106 tracks the location of the ears of player 100. When sounds are generated in the game (e.g., the sound of a helicopter flying) game console 106 determines the coordinates in the virtual space of the sound origin. Once the location of the ears and the location of the sound origin are known, the game console 106 determines the relative location between the sound origin and the ears perceiving the sound.

In one implementation, user 100 is wearing headphones 1716. The HRTF of the user is used to convert the sound into a localized sound that appears to the user as coming from the sound origin. The localized sound, which is transmitted to the headphones 1716 (possibly via the HMD as described above), includes different acoustic signals for each of the individual speakers of the headphones in order to simulate the location of the sound origin.

In another implementation, the localized sound is produced by speakers 1820. The game console 106 has information regarding the location of the speakers 1820 in the room. Again, the HRTF of the user is used to convert the sound into a localized sound that appears to the user as coming from the sound origin. The localized sound, which is transmitted to speakers 1820, includes different acoustic signals for each of the speakers 1820 in order to simulate the location of the sound origin.

In this case the localized sound is delivered to the speakers instead of to the headphones. The algorithms for sound localization using speakers and using headphones are similar, but in the case of speakers, the location is fixed, whereas the location of the user may change. There is a travel time for the sound coming from each speaker, which has to be considered by the sound localization algorithm. In the case of headphones the location has to be tracked because the headphones move when the user moves.

The sound localization algorithm uses the HRTF of the user, as well as the current location of the user's ears to generate the localized sound for the earphones. The acoustic signals for the localized sound, which are played by the earphones, provide an acoustic clue to the user regarding the virtual location in space of the virtual object.

In one implementation, the acoustic signals for the localized sounds are delivered with a higher volume when the object or person originating the sound is shown on the display of the HMD 102, or in the display 207 (e.g. a shared/social screen) connected to game console 106. The HMD is acting, in a sense, also as a directional microphone. When the sound origin is not on the HMD's display, the volume of the sound is lower. Because the HMD is working as a directional microphone, the user has an acoustic cue to the whereabouts of the origin of the sound as the user moves the HMD.

Remote player 1806*b* is assigned a position in the physical space of player 100. Sound localization includes generating sounds that appear to come from player 1806*b* or from portable device 1808*b*. For example, when player 1806*b* speaks, the speech is captured by portable device 1808*b* and then transmitted to game console 106. The speech from user 1806*b* is then transformed using HRTF, or some other sound localization algorithm, to deliver the speech to user 100 as if player 1806*b* were standing near player 100 as indicated in the illustrated virtual scene.

In one implementation, GPS is used for tracking the user. For example, a GPS module in the HMD or game console is used to determine a GPS location for the user. If user 1806*b* is situated in a remote location (e.g., a few miles away), the GPS location of user 1806*b* can be used for sound effects. For example, user 1806*b* has a game cannon, which is fired by the remote player. A sound effect simulates the fire of the cannon from the actual location of user 1806*b*. The firing shot is heard first, and is followed by the sound of the cannonball as the cannonball travels through the air from the location of player 1806*b* to the location of player 100. As the cannonball travels through the air, the sound increases in intensity, as in real life. Finally, the explosion is heard when the cannonball hits the target, and if the target is near the user, the sound will be delivered with high volume.

Figure 19:
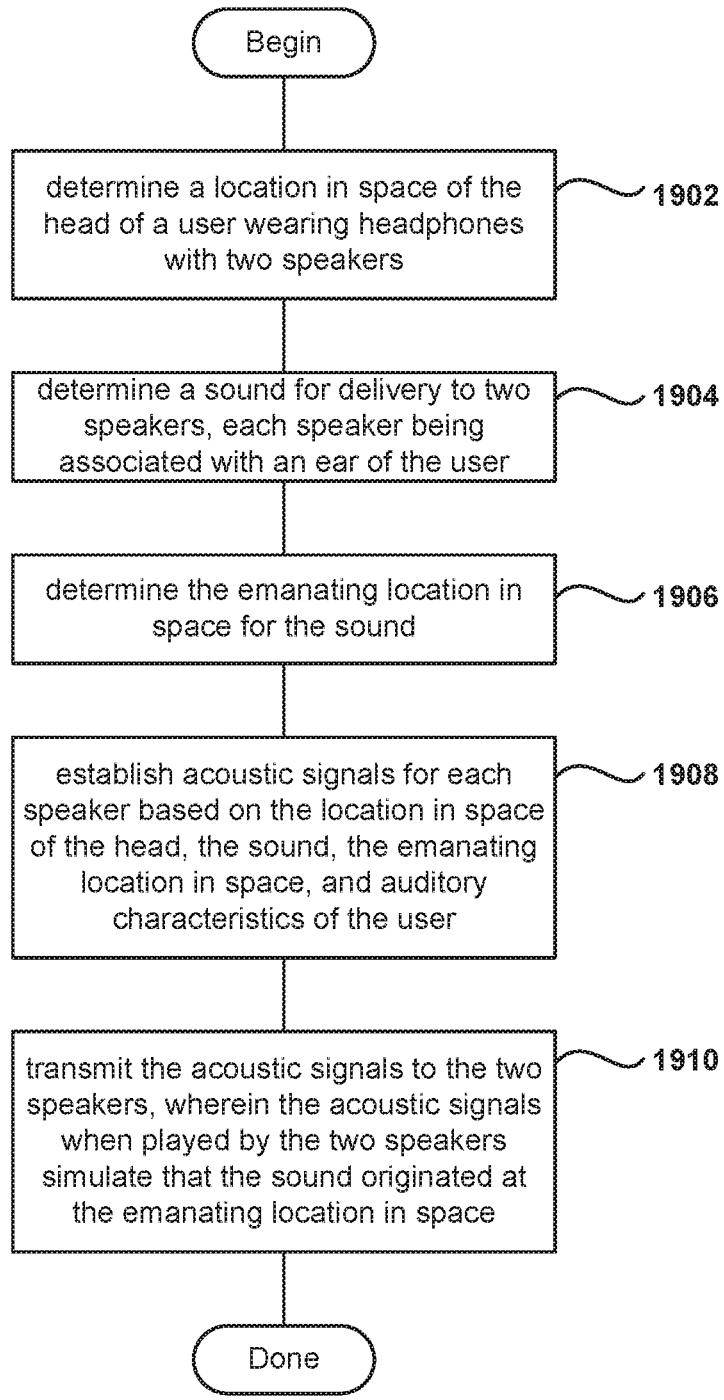
FIG. 19 is a flowchart of a sound localization algorithm for simulating the source of sound, according to implementations of the invention.

FIG. 19 is a flowchart of a sound localization algorithm for simulating the source of sound, according to implementations of the invention. In operation 1902, a location in space of the head of the user is determined, where the user is wearing headphones that include two speakers. As previously described, a plurality of methods can be utilized to determine the location of the headphones, such as ultrasound, image analysis, RFID, GPS, infrared, etc. Further, in operation 1904, the sound that is to be delivered to the speakers is determined, each speaker being associated with one of user's ears. In other words, one speaker is situated next to the left ear, and the other speaker is situated next to the right ear. In operation 1906 the emanating location for the sound is determined. The emanating location for the sound refers to the point in space that defines a virtual origin for the sound that is to be delivered to the user, such that the user gets the impression that the sound is coming from that sound origin.

In operation 1908, the acoustic signals for each speakers are established based on the location in space of the head, the sound, the emanating location in space, and the auditory characteristics of the user. The auditory characteristics of the user define the physical aspects of the user that affect how the user localizes where sound comes from. In one implementation, the auditory characteristics of the user are defined by the pair of HRTFs for the user's ears.

After operation 1908 the method flows to operation 1910, where the acoustic signals are transmitted to the two speakers. When the acoustic signals are played by the two speakers the sound appears to have originated at the emanating location in space.

Figure 20:
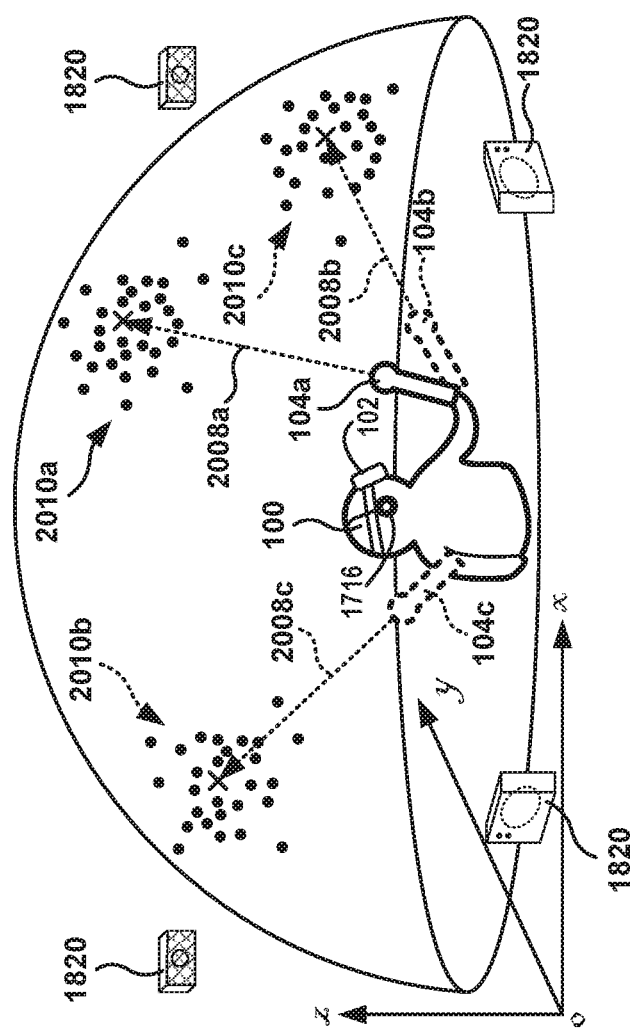
FIG. 20 illustrates a method for selecting a sound localization function based on the user perception of the sound received, in accordance with implementations of the disclosure.

FIG. 20 illustrates a method for selecting a sound localization function based on the user perception of the sound received, in accordance with implementations of the disclosure. Virtual surround through headphones works best with an accurate measurement of the person's HRTF (or some other sound localization function). The process to measure HRTF is difficult (i.e., the process requires putting small microphones in the person's ear, and sitting perfectly straight while a speaker is moved all around the head at various positions and distances). Implementations of the invention utilize a database of measured HRTFs for a population of users. In one implementation, a motion controller is utilized to create a sound localization function for the user that is based on one or more HRTFs from the database. The HRTF for the user is not actually measured, but by finding one or more HRTFs that "work" for the user, a realistic virtual surround system with localized sound delivery is provided.

It is not practical to have a sound localization function for millions of users. Implementations of the invention utilize the measured sound localization functions for a representative segment of people, and then tests are performed to select one of these functions for a particular user.

In the implementation of FIG. 20, user 100 is in a room and wearing HMD 102 and headphones 1716. It should be noted that the calibration process may also be performed with a plurality of speakers 2002 instead of headphones. The computer system plays a sound through headphones 1716, and the user is asked to point controller 104*a* in the direction 2008*a* that the user believes was the source of the sound. Based on the direction 2008*a*, identified by the user as the origin of the sound, the system selects one or more sound localization functions from the database that match this direction. In other words, after each response by the user 100, the system narrows the sound localization functions that could meet the characteristics of user 100.

In one implementation, the user is offered two choices. If the user is not sure where the sound is coming from, a first button is pressed on the controller to indicate that the user is not sure. On the other hand, if the user identifies a direction, the user presses a second button while pointing in the direction of the sound. This allows people to find an appropriate sound localization function by searching through the database of sound localization functions (e.g., HRTFs), and find the function that most closely matches the user input (e.g., the direction identified by the controller).

The process is repeated with other sounds at different locations. A new direction (e.g., 2008*b*, 2008*c*) is obtained for each sound based on the location of the controller (e.g., 104*b*, 104*c*), and the sound localization functions are analyzed to find the best match for the location. In one implementation, the best match is the sound localization function that offers the best overall performance for all test sounds.

In another implementation, the function for this particular user is a combination of sound functions, where the space around the user is divided into sectors, and sounds coming from each sector use a function associated with that sector, where each sector has a different associated function. In one implementation, interpolation is used, and some of the sectors use interpolation from two or more functions. The desired goal is not to have a perfectly chosen function, but rather the goal is to have a number of acceptable functions at various locations, which are sufficient to fill up the required 3D volume for a specific game, or for a range of games. If it is deemed that a certain number of discrete transfer functions is better than selecting just one function, then there is no need to just select one function. In one implementation, interpolation is used to fill the gaps in areas where actual testing has not been performed, as it would be very tedious to perform tests for the whole 3-D space around the user.

The sound played for each test may be the same sound, but projected from a different location, or the sound may change from location to location in order to acquire data for different audio frequencies. This may reduce user confusion because the user will not feel that all the sounds are exactly the same, and that the sounds are coming from the same place.

If one transfer function does not properly match the sound characteristic of the user for all test sounds, in one implementation, the sound function calculated for the user is a combination of functions that take into account, not only the area where the sound is coming from, but also the type of sound (e.g. the dominating frequency for the sound) being produced. For example, in a particular spot in the 3-D space, a first function may be used for low frequency sounds, and a second function for high or medium frequency sounds.

Since the function associated with user 100 is not known, a sound localization function $f_1$ from the database is chosen to begin the calibration process. When the user points 104$a$ in direction 2008$a$ the system analyzes what localization function $fu$, or functions, may cause this response when the sound is generated using $f_1$. In other words, the system needs to correlate $f_1$ with other functions in the database. If s is the sound selected for the test (e.g., a dog bark), $l_1$ is the location of the sound, and $ls_1$ is the localized sound delivered at the speakers, equation (1) becomes:

$$ls_1 = f_1(s, l_1) \quad (2)$$

When the user points in direction 2008$a$, a location $l_2$ is calculated based on direction 2008$a$. If $f_u$ is a function that matches sound s user for this sound and location $l_2$, then the following equation is obtained:

$$ls_1 = f u(s, l_2) \quad (3)$$

This means, that for the same sound test (e.g., the dog bark), $f_1$ and $f_u$ would produce the same sound sent to the speakers, but the location perceived by the user changes because of the different sound localization functions. In other words, a user with a function of $f_1$ perceives the sound coming from $l_1$, and a user with function $f_u$ perceives the same sound coming from $l_2$.

Combining equations (2) and (3), the following identity is obtained:

$$f_1(s, l_1) = f_u(s, l_2) \quad (4)$$

Since $f_1$, s, $l_1$, and $l_2$ are known, $f_u$ can be obtained utilizing equation (4). However, it is noted that $f_u$ works for this user for location $l_2$, but $f_u$ may not work for other locations. Since equation (4) might be satisfied for many functions in the database, continuing with the tests in different locations allows the system to select which of the possible functions better works for this user. In one implementation, the testing process continues by eliminating the functions that do not work, until one final function is selected (the one that better matches the characteristics of the user).

In one implementation, the same function $f_i$ is used for all the tests. In another implementation, the function used for each test changes as the system starts fine-tuning the function, or functions, that work best for this user. For example, in the second test, the chosen function $f_u$ obtained in the previous test is used for the second test, instead of $f_1$. After the second test, a new function $f_{u2}$ is selected based on the two measurements. And the process is repeated to calculate a new function after each test, based on the measurements from all the tests.

It is noted that if the user moves the head while the calibration is taking place, the movement may alter the results. In one implementation, the sound is short, and the effect of head movement is eliminated, or substantially reduced. In another implementation, the head of the user is tracked, which means that the location of the ears is known during the test. In one implementation, the head tracking is performed by analyzing images taken of the user, but other methods may also be utilized, such as using headphones with a magnetometer, etc.

Figure 21:
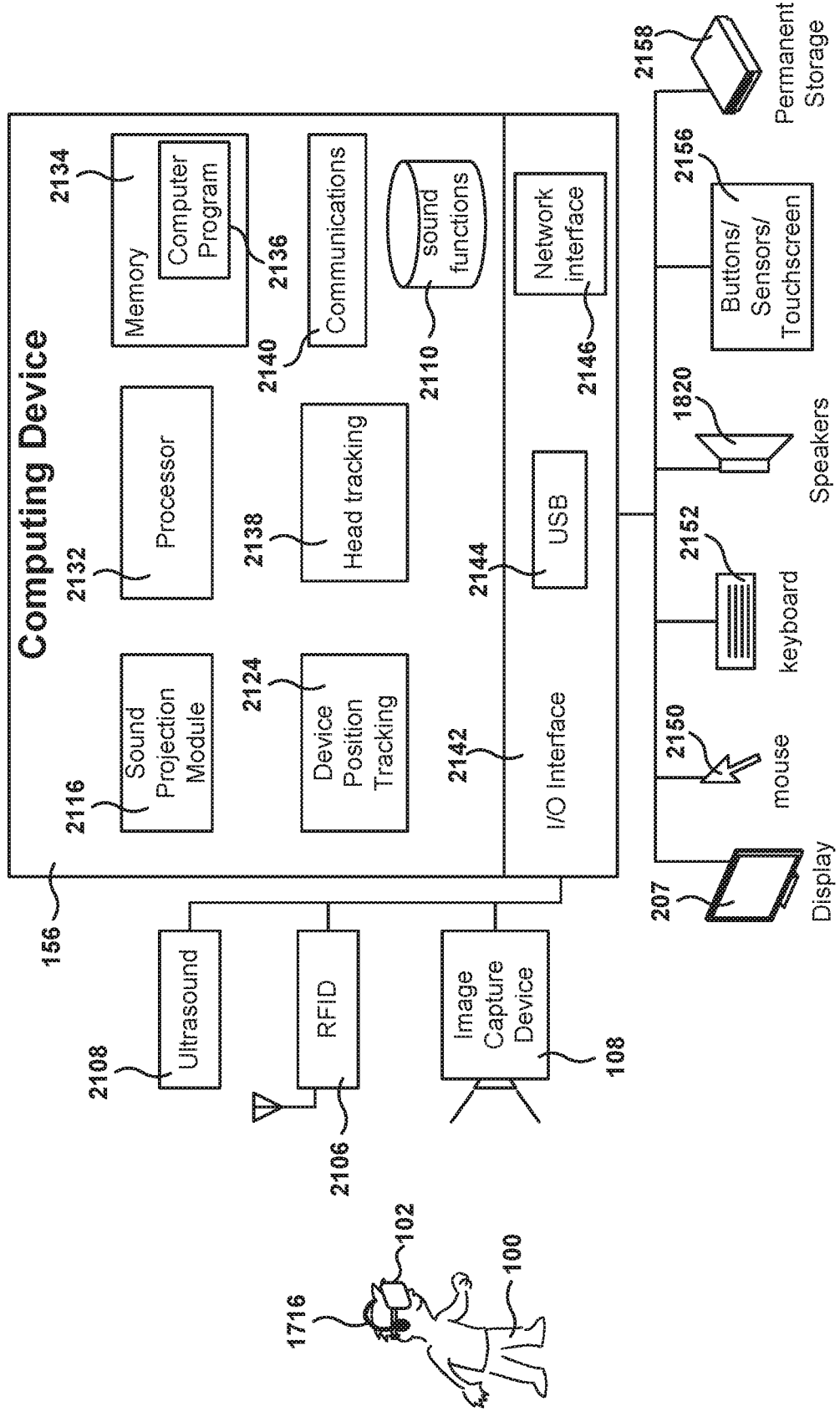
FIG. 21 is a simplified schematic diagram of a computer system for implementing implementations of the present invention.

FIG. 21 is a simplified schematic diagram of a computer system for implementing implementations of the present invention. It should be appreciated that the methods described herein may be performed with a digital processing system, such as a conventional, general-purpose computer system. Special purpose computers, which are designed or programmed to perform one or more specific functions, may be used in the alternative. Computing device 106 includes a processor 2132, which is coupled to memory 2134, to permanent storage device 2158, and to other modules inside, or connected to, computing device 106. Sound localization computer program 2136 resides in memory 2134, but can also reside in permanent storage device 2158.

Computing device 106 is in communication with sound/ultrasound capture device 2108, image capture device 108, and display 207. In one implementation, sound capture device 2108, image capture device 108, RFID module 2106, and display 207 may be embedded within computing device 106 or be a separate unit. In one implementation, the ultrasound capture device includes a microphone, and in another implementation, the ultrasound capture device includes a microphone array.

Device Position Tracking module 724 determines the location of devices such as the HMD 102, headphones 1716, controllers 104, etc. A plurality of technologies can be used for position tracking such as ultrasound, GPS, RFID, image analysis, triangulation, inertial, etc., or a combination thereof. Head Tracking module 2138 determines the position of one or two of the user's ears (which may be determined indirectly by determining a location of the headphones). Head Tracking module 2138 may determine the position of the user's ears using one or more different technologies such as image recognition, RFID, ultrasound, infrared, triangulation, etc. or based on the tracking of devices worn by the user such as the HMD or headphones.

Sound Projection module 2116 modifies sound signals, intended for delivery to a sound system, in order to perform sound localization, such that the user receiving the modified sound signals will have the impression that the sound emanates from the intended location. Sound projection module 2116 uses the location information provided by device position tracking module 2124 and head tracking module 2138 to modify the sound signals.

Permanent storage device 2158 represents a persistent data storage device such as a floppy disc drive or a fixed disc drive, which may be local or remote. Network interface 746 provides network connectivity, allowing communications with other devices. It should be appreciated that processor 2132 may be embodied in a general-purpose processor, a special purpose processor, or a specially programmed logic device. Input/Output (I/O) interface 2142 provides communication with different peripherals, such as display 207, keyboard 2152, mouse 2150, ultrasound capture device 2108, image capture device 108, speakers 1820, headphones 1716, buttons, sensors, touchscreen 2156, etc. A Universal Serial Bus (USB) module 2144 provides connectivity to USB devices.

The HMD 102 and/or display 207 are configured to display the user interfaces described herein. Keyboard 2152, mouse 2150, and other peripherals are coupled to I/O interface 2142 in order to communicate information to processor 2132. It should be appreciated that data to and from external devices may be communicated through I/O interface 2142. The invention can also be practiced in distributed computing environments where tasks are performed by remote processing devices that are linked through a wire-based or wireless network.

Database 2110 includes a plurality of sound localization functions associated with a plurality of different users. In one implementation, the sound localization functions are the measured HRTF functions obtained for a plurality of users, but other sound localization functions can also be utilized. Database 2110 can be used to build a sound localization function for the user that leverages existing functions obtained for other users.

It is noted that the implementation illustrated in FIG. 21 is exemplary. Other implementations may utilize different modules, or have several functions performed by one module, etc. The implementation illustrated in FIG. 21 should therefore not be interpreted to be exclusive or limiting, but rather exemplary or illustrative.

Figure 22:
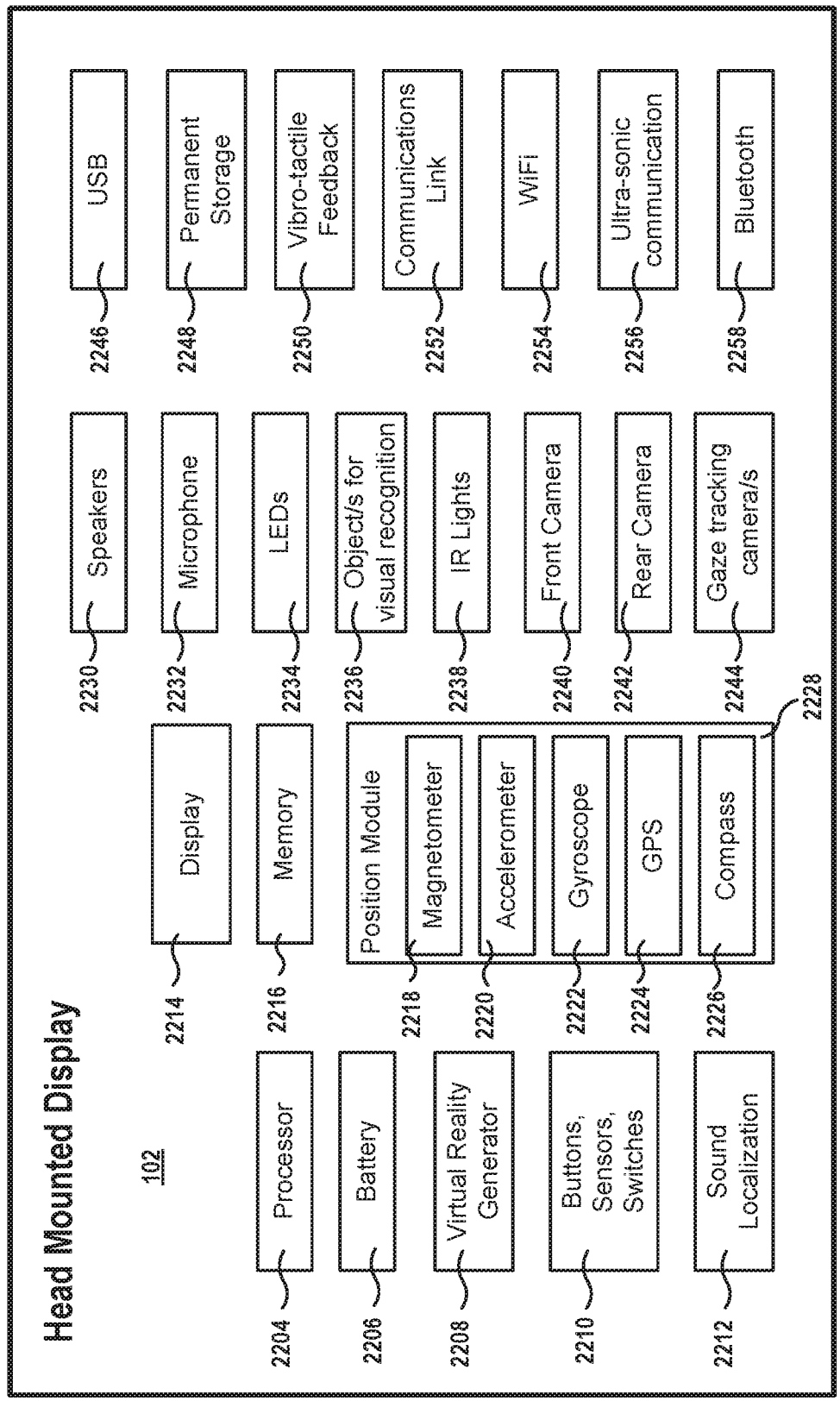
FIG. 22 illustrates the architecture of a device that may be used to implement implementations of the invention.

FIG. 22 illustrates the architecture of a device that may be used to implement implementations of the invention. The head mounted display is a computing device and includes modules usually found on a computing device, such as a processor 2204, memory 2216 (RAM, ROM, etc.), one or more batteries 2206 or other power sources, and permanent storage 2248 (such as a hard disk).

The communication modules allow the HMD to exchange information with other portable devices, other computers, other HMD's, servers, etc. The communication modules include a Universal Serial Bus (USB) connector 2246, a communications link 2252 (such as Ethernet), ultrasonic communication 2256, Bluetooth 2258, and WiFi 2254.

The user interface includes modules for input and output. The input modules include input buttons, sensors and switches 2210, microphone 2232, touch sensitive screen (not shown, that may be used to configure or initialize the HMD), front camera 2240, rear camera 2242, gaze tracking cameras 2244. Other input/output devices, such as a keyboard or a mouse, can also be connected to the portable device via communications link, such as USB or Bluetooth.

The output modules include the display 2214 for rendering images in front of the user's eyes. Some implementations may include one display, two displays (one for each eye), micro projectors, or other display technologies. Other output modules include Light-Emitting Diodes (LED) 2234 (which may also be used for visual tracking of the HMD), vibro-tactile feedback 2250, speakers 2230, and sound localization module 2212, which performs sound localization for sounds to be delivered to speakers or headphones. Other output devices, such as headphones, can also connect to the HMD via the communication modules.

The elements that may be included to facilitate motion tracking include LEDs 2234, one or more objects for visual recognition 2236, and infrared lights 2238.

Information from different devices can be used by the Position Module 2228 to calculate the position of the HMD. These modules include a magnetometer 2218, an accelerometer 2220, a gyroscope 2222, a Global Positioning System (GPS) module 2224, and a compass 2226. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator 2208 creates the virtual or augmented reality, as previously described, using the position calculated by the Position Module. The virtual reality generator 2208 may cooperate with other computing devices (e.g., game console, Internet server, etc.) to generate images for the display module 2214. The remote devices may send screen updates or instructions for creating game objects on the screen.

It should be appreciated that the implementation illustrated in FIG. 22 is an exemplary implementation of an HMD. Other implementations may utilize different modules, a subset of the modules, or assign related tasks to different modules. The implementation illustrated in FIG. 22 should therefore not be interpreted to be exclusive or limiting, but rather exemplary or illustrative.

Figure 23:
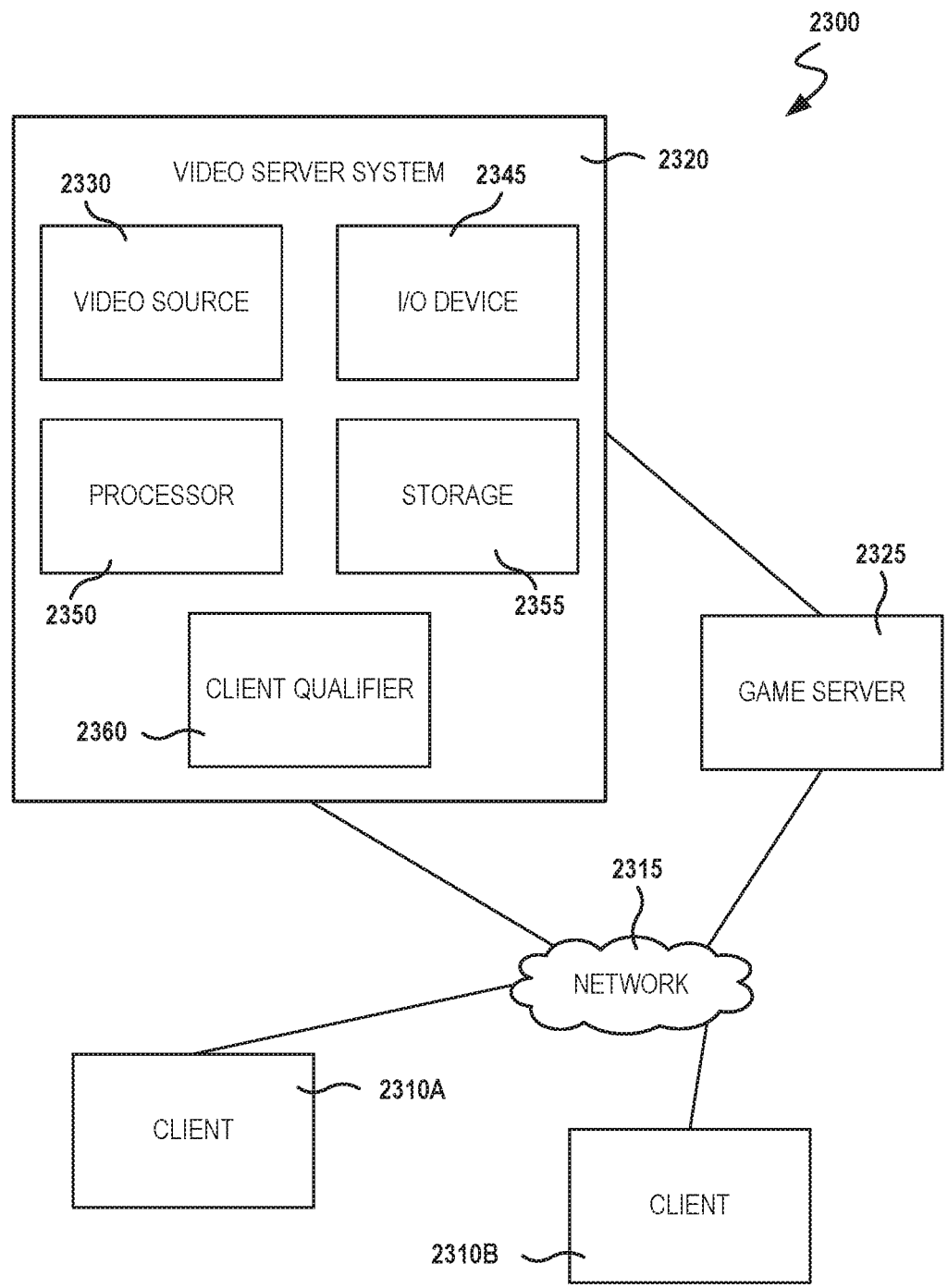
FIG. 23 is a block diagram of a Game System 2300, according to various implementations of the disclosure.

FIG. 23 is a block diagram of a Game System 2300, according to various implementations of the disclosure. Game System 2300 is configured to provide a video stream to one or more Clients 2310 via a Network 2315. Game System 2300 typically includes a Video Server System 2320 and an optional game server 2325. Video Server System 2320 is configured to provide the video stream to the one or more Clients 2310 with a minimal quality of service. For example, Video Server System 2320 may receive a game command that changes the state of or a point of view within a video game, and provide Clients 2310 with an updated video stream reflecting this change in state with minimal lag time. The Video Server System 2320 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative implementations of the disclosure.

Clients 2310, referred to herein individually as 2310A, 2310B, etc., may include head mounted displays, terminals, personal computers, game consoles, tablet computers, telephones, set top boxes, kiosks, wireless devices, digital pads, stand-alone devices, handheld game playing devices, and/or the like. Typically, Clients 2310 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 2310 or on a separate device such as a monitor or television. Clients 2310 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 2310 are optionally geographically dispersed. The number of clients included in Game System 2300 may vary widely from one or two to thousands, tens of thousands, or more. As used herein, the term "game player" is used to refer to a person that plays a game and the term "game playing device" is used to refer to a device used to play a game. In some implementations, the game playing device may refer to a plurality of computing devices that cooperate to deliver a game experience to the user. For example, a game console and an HMD may cooperate with the video server system 2320 to deliver a game viewed through the HMD. In one implementation, the game console receives the video stream from the video server system 2320, and the game console forwards the video stream, or updates to the video stream, to the HMD for rendering.

Clients 2310 are configured to receive video streams via Network 2315. Network 2315 may be any type of communication network including, a telephone network, the Internet, wireless networks, powerline networks, local area networks, wide area networks, private networks, and/or the like. In typical implementations, the video streams are communicated via standard protocols, such as TCP/IP or UDP/IP. Alternatively, the video streams are communicated via proprietary standards.

A typical example of Clients 2310 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 2310 may, but are not required to, further include systems configured for modifying received video. For example, a Client may be configured to perform further rendering, to overlay one video image on another video image, to crop a video image, and/or the like. For example, Clients 2310 may be configured to receive various types of video frames, such as I-frames, P-frames and B-frames, and to process these frames into images for display to a user. In some implementations, a member of Clients 2310 is configured to perform further rendering, shading, conversion to 3-D, or like operations on the video stream. A member of Clients 2310 is optionally configured to receive more than one audio or video stream. Input devices of Clients 2310 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 2310 is generated and provided by Video Server System 2320. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 2310 are typically configured to receive inputs from a user. These inputs may include game commands configured to change the state of the video game or otherwise affect game play. The game commands can be received using input devices and/or may be automatically generated by computing instructions executing on Clients 2310. The received game commands are communicated from Clients 2310 via Network 2315 to Video Server System 2320 and/or Game Server 2325. For example, in some implementations, the game commands are communicated to Game Server 2325 via Video Server System 2320. In some implementations, separate copies of the game commands are communicated from Clients 2310 to Game Server 2325 and Video Server System 2320. The communication of game commands is optionally dependent on the identity of the command Game commands are optionally communicated from Client 2310A through a different route or communication channel that that used to provide audio or video streams to Client 2310A.

Game Server 2325 is optionally operated by a different entity than Video Server System 2320. For example, Game Server 2325 may be operated by the publisher of a multiplayer game. In this example, Video Server System 2320 is optionally viewed as a client by Game Server 2325 and optionally configured to appear from the point of view of Game Server 2325 to be a prior art client executing a prior art game engine. Communication between Video Server System 2320 and Game Server 2325 optionally occurs via Network 2315. As such, Game Server 2325 can be a prior art multiplayer game server that sends game state information to multiple clients, one of which is game server system 2320. Video Server System 2320 may be configured to communicate with multiple instances of Game Server 2325 at the same time. For example, Video Server System 2320 can be configured to provide a plurality of different video games to different users. Each of these different video games may be supported by a different Game Server 2325 and/or published by different entities. In some implementations, several geographically distributed instances of Video Server System 2320 are configured to provide game video to a plurality of different users. Each of these instances of Video Server System 2320 may be in communication with the same instance of Game Server 2325. Communication between Video Server System 2320 and one or more Game Server 2325 optionally occurs via a dedicated communication channel. For example, Video Server System 2320 may be connected to Game Server 2325 via a high bandwidth channel that is dedicated to communication between these two systems.

Video Server System 2320 comprises at least a Video Source 2330, an I/O Device 2345, a Processor 2350, and non-transitory Storage 2355. Video Server System 2320 may include one computing device or be distributed among a plurality of computing devices. These computing devices are optionally connected via a communications system such as a local area network.

Video Source 2330 is configured to provide a video stream, e.g., streaming video or a series of video frames that form a moving picture. In some implementations, Video Source 2330 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 2325. Game Server 2325 may maintain a copy of the state of the game based on game commands received from multiple players using geographically disperse clients. In these cases, the game state is provided by Game Server 2325 to Video Source 2330, wherein a copy of the game state is stored and rendering is performed. Game Server 2325 may receive game commands directly from Clients 2310 via Network 2315, and/or may receive game commands via Video Server System 2320.

Video Source 2330 typically includes rendering logic, e.g., hardware, firmware, and/or software stored on a computer readable medium such as Storage 2355. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 2310. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative implementations Video Source 2330 includes a video recording device such as a camera. This camera may be used to generate delayed or live video that can be included in the video stream of a computer game. The resulting video stream, optionally includes both rendered images and images recorded using a still or video camera. Video Source 2330 may also include storage devices configured to store previously recorded video to be included in a video stream. Video Source 2330 may also include motion or positioning sensing devices configured to detect motion or position of an object, e.g., person, and logic configured to determine a game state or produce video-based on the detected motion and/or position.

Video Source 2330 is optionally configured to provide overlays configured to be placed on other video. For example, these overlays may include a command interface, log in instructions, messages to a game player, images of other game players, video feeds of other game players (e.g., webcam video). In implementations of Client 2310A including a touch screen interface or a gaze detection interface, the overlay may include a virtual keyboard, joystick, touch pad, and/or the like. In one example of an overlay a player's voice is overlaid on an audio stream. Video Source 2330 optionally further includes one or more audio sources.

In implementations wherein Video Server System 2320 is configured to maintain the game state based on input from more than one player, each player may have a different point of view comprising a position and direction of view. Video Source 2330 is optionally configured to provide a separate video stream for each player based on their point of view. Further, Video Source 2330 may be configured to provide a different frame size, frame data size, and/or encoding to each of Client 2310. Video Source 2330 is optionally configured to provide 3-D video.

I/O Device 2345 is configured for Video Server System 2320 to send and/or receive information such as video, commands, requests for information, a game state, gaze information, device motion, device location, user motion, client identities, player identities, game commands, security information, audio, and/or the like. I/O Device 2345 typically includes communication hardware such as a network card or modem. I/O Device 2345 is configured to communicate with Game Server 2325, Network 2315, and/or Clients 2310.

Processor 2350 is configured to execute logic, e.g. software, included within the various components of Video Server System 2320 discussed herein. For example, Processor 2350 may be programmed with software instructions in order to perform the functions of Video Source 2330, Game Server 2325, and/or a Client Qualifier 2360. Video Server System 2320 optionally includes more than one instance of Processor 2350. Processor 2350 may also be programmed with software instructions in order to execute commands received by Video Server System 2320, or to coordinate the operation of the various elements of Game System 2300 discussed herein. Processor 2350 may include one or more hardware device. Processor 2350 is an electronic processor.

Storage 2355 includes non-transitory analog and/or digital storage devices. For example, Storage 2355 may include an analog storage device configured to store video frames. Storage 2355 may include a computer readable digital storage, e.g. a hard drive, an optical drive, or solid state storage. Storage 2315 is configured (e.g. by way of an appropriate data structure or file system) to store video frames, artificial frames, a video stream including both video frames and artificial frames, audio frame, an audio stream, and/or the like. Storage 2355 is optionally distributed among a plurality of devices. In some implementations, Storage 2355 is configured to store the software components of Video Source 2330 discussed elsewhere herein. These components may be stored in a format ready to be provisioned when needed.

Video Server System 2320 optionally further comprises Client Qualifier 2360. Client Qualifier 2360 is configured for remotely determining the capabilities of a client, such as Clients 2310A or 2310B. These capabilities can include both the capabilities of Client 2310A itself as well as the capabilities of one or more communication channels between Client 2310A and Video Server System 2320. For example, Client Qualifier 2360 may be configured to test a communication channel through Network 2315.

Client Qualifier 2360 can determine (e.g., discover) the capabilities of Client 2310A manually or automatically. Manual determination includes communicating with a user of Client 2310A and asking the user to provide capabilities. For example, in some implementations, Client Qualifier 2360 is configured to display images, text, and/or the like within a browser of Client 2310A. In one implementation, Client 2310A is an HMD that includes a browser. In another implementation, client 2310A is a game console having a browser, which may be displayed on the HMD. The displayed objects request that the user enter information such as operating system, processor, video decoder type, type of network connection, display resolution, etc. of Client 2310A. The information entered by the user is communicated back to Client Qualifier 2360.

Automatic determination may occur, for example, by execution of an agent on Client 2310A and/or by sending test video to Client 2310A. The agent may comprise computing instructions, such as java script, embedded in a web page or installed as an add-on. The agent is optionally provided by Client Qualifier 2360. In various implementations, the agent can find out processing power of Client 2310A, decoding and display capabilities of Client 2310A, lag time reliability and bandwidth of communication channels between Client 2310A and Video Server System 2320, a display type of Client 2310A, firewalls present on Client 2310A, hardware of Client 2310A, software executing on Client 2310A, registry entries within Client 2310A, and/or the like.

Client Qualifier 2360 includes hardware, firmware, and/or software stored on a computer readable medium. Client Qualifier 2360 is optionally disposed on a computing device separate from one or more other elements of Video Server System 2320. For example, in some implementations, Client Qualifier 2360 is configured to determine the characteristics of communication channels between Clients 2310 and more than one instance of Video Server System 2320. In these implementations the information discovered by Client Qualifier can be used to determine which instance of Video Server System 2320 is best suited for delivery of streaming video to one of Clients 2310.

Implementations of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above implementations in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present implementations are to be considered as illustrative and not restrictive, and the disclosure is not to be limited to the details given herein, but may be modified within the scope and equivalents of the present disclosure.

What is claimed is:

1. A method, comprising:
   receiving captured images of an interactive environment in which a head-mounted display (HMD) is disposed;
   receiving inertial data processed from at least one inertial sensor of the HMD;
   analyzing the captured images of the interactive environment and the inertial data to determine a current location of the HMD and a predicted future location of the HMD;
   using the predicted future location of the HMD to adjust a beamforming direction of an RF transceiver in a direction that is towards the predicted future location of the HMD;
   tracking a gaze of a user of the HMD, wherein tracking the gaze of the user includes capturing images of an eye of the user by a gaze tracking camera in the HMD;
   generating video depicting a view of a virtual environment for the HMD, wherein regions of the view are differentially rendered based on the tracked gaze of the user;
   tracking a trajectory of the gaze of the user over a predetermined period of time, wherein tracking the trajectory of the gaze uses the captured images of the eye of the user;
   tracking a trajectory of the HMD over the predetermined period of time;
   predicting, while tracking the trajectory of the gaze, a movement of the gaze of the user to a predicted future region where the user will look next in the virtual environment based on analyzing a trend in the tracked trajectory of the gaze of the user and based on analyzing a trend in the tracked trajectory of the HMD;
   wherein the regions of the view are differentially rendered based on the predicted movement of the gaze of the user, wherein the predicted future region starts to render before the gaze of the user is at the predicted future region;
   generating audio data depicting sounds from the virtual environment, the audio data being configured to enable localization of the sounds by the user when rendered to headphones that are connected to the HMD;
   wirelessly transmitting the video and the audio data via the RF transceiver to the HMD using the adjusted beamforming direction.

2. The method of claim 1, wherein a region of the view towards which the gaze of the user is directed is rendered at a higher image quality setting than other regions of the view, the other regions of the view being rendered at a lower image quality setting to reduce a size of the video.

3. The method of claim 2, wherein the image quality setting includes one or more of an update frequency, resolution, complexity of imagery, or a rendering order value that determines an order for rendering the regions of the view.

4. The method of claim 1, wherein generating the audio data includes determining one or more emanating locations in the virtual environment for the sounds, wherein the audio data is configured to simulate the sounds as originating from the one or more emanating locations when rendered to the headphones.

5. The method of claim 1, wherein generating the audio data uses an HRTF that is identified for the user.

6. The method of claim 1, wherein generating the audio data is based on the current and/or predicted future location of the HMD.

7. The method of claim 1, wherein analyzing the captured images and the inertial data includes identifying movement of the HMD, the predicted future location of the HMD being determined using the identified movement of the HMD.

8. The method of claim 7,
wherein identifying movement of the HMD includes determining a motion vector of the HMD, the predicted future location of the HMD being determined by applying the motion vector of the HMD to a current location of the HMD;
wherein a magnitude of the motion vector identifies a speed of the movement of the HMD, and wherein a direction of the motion vector identifies a direction of the movement of the HMD.

9. The method of claim 8, further comprising:
adjusting an angular spread of the RF transceiver based on the speed of the movement of the HMD;
wherein the angular spread increases with increasing speed of the movement of the HMD.

10. The method of claim 1, wherein analyzing the captured images and the inertial data includes identifying movement of the HMD, the predicted future location of the HMD being determined using the identified movement of the HMD.

11. A method, comprising:
receiving captured images of an interactive environment in which a head-mounted display (HMD) is disposed;
receiving inertial data processed from at least one inertial sensor of the HMD;
analyzing the captured images of the interactive environment and the inertial data to determine a current location of the HMD and a predicted future location of the HMD;
using the predicted future location of the HMD to adjust a beamforming direction of an RF transceiver in a direction that is towards the predicted future location of the HMD;
tracking a gaze of a user of the HMD, wherein tracking the gaze of the user includes capturing images of an eye of the user by a gaze tracking camera in the HMD;
generating video depicting a view of a virtual environment for the HMD, wherein regions of the view are differentially rendered based on the tracked gaze of the user;
tracking a trajectory of the gaze of the user over a predetermined period of time, wherein tracking the trajectory of the gaze uses the captured images of the eye of the user;
tracking a trajectory of the HMD over the predetermined period of time;
predicting, while tracking the trajectory of the gaze, a movement of the gaze of the user to a predicted future region where the user will look next in the virtual environment based on analyzing a trend in the tracked trajectory of the gaze of the user and based on analyzing a trend in the tracked trajectory of the HMD;
wherein the regions of the view are differentially rendered based on the predicted movement of the gaze of the user, wherein the predicted future region starts to render before the gaze of the user is at the predicted future region;
transmitting the video via the RF transceiver to the HMD using the adjusted beamforming direction.

12. The method of claim 11, wherein a region of the view towards which the gaze of the user is directed is rendered at a higher image quality setting than other regions of the view, the other regions of the view being rendered at a lower image quality setting to reduce a size of the video.

13. The method of claim 12, wherein the image quality setting includes one or more of an update frequency, resolution, complexity of imagery, or a rendering order value that determines an order for rendering the regions of the view.

14. The method of claim 11, wherein analyzing the captured images and the inertial data includes identifying movement of the HMD, the predicted future location of the HMD being determined using the identified movement of the HMD.

15. A method, comprising:
receiving captured images of an interactive environment in which a head-mounted display (HMD) is disposed;
receiving inertial data processed from at least one inertial sensor of the HMD;
analyzing the captured images of the interactive environment and the inertial data to determine a current location of the HMD and a predicted future location of the HMD;
using the predicted future location of the HMD to adjust a beamforming direction of an RF transceiver in a direction that is towards the predicted future location of the HMD;
generating audio data depicting sounds from the virtual environment, the audio data being configured to enable localization of the sounds by a user when rendered to headphones that are connected to the HMD;
transmitting the audio data via the RF transceiver to the HMD using the adjusted beamforming direction;
tracking a trajectory of a gaze of the user over a predetermined period of time, wherein tracking the trajectory of the gaze uses captured images of an eye of the user captured by a gaze tracking camera in the HMD;
predicting, while tracking the trajectory of the gaze, a movement of the gaze of the user to a predicted future region where the user will look next in the virtual environment based on analyzing a trend in the tracked trajectory of the gaze of the user;
wherein regions of a view of a virtual environment for the HMD are differentially rendered based on the predicted movement of the gaze of the user, wherein the predicted future region starts to render before the gaze of the user is at the predicted future region.

16. The method of claim 15, wherein generating the audio data includes determining one or more emanating locations in the virtual environment for the sounds, wherein the audio data is configured to simulate the sounds as originating from the one or more emanating locations when rendered to the headphones.

17. The method of claim 15, wherein generating the audio data uses an HRTF that is identified for the user.

18. The method of claim 15, wherein generating the audio data is based on the current and/or predicted future location of the HMD.

* * * * *